United States Patent
Xu et al.

(10) Patent No.: US 11,540,323 B2
(45) Date of Patent: Dec. 27, 2022

(54) 2-STEP RANDOM ACCESS

(71) Applicant: Apple Inc., Cupertino, CA (US)

(72) Inventors: Fangli Xu, Beijing (CN); Dawei Zhang, Saratoga, CA (US); Haijing Hu, Beijing (CN); Yuqin Chen, Shenzhen (CN); Wei Zeng, San Diego, CA (US); Haitong Sun, Irvine, CA (US); Yuchul Kim, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 102 days.

(21) Appl. No.: 16/781,337

(22) Filed: Feb. 4, 2020

(65) Prior Publication Data

US 2020/0260498 A1 Aug. 13, 2020

(30) Foreign Application Priority Data

Feb. 13, 2019 (CN) .......................... 201910112653.1

(51) Int. Cl.
*H04W 74/08* (2009.01)
*H04W 72/04* (2009.01)
*H04W 52/36* (2009.01)

(52) U.S. Cl.
CPC ....... *H04W 74/0833* (2013.01); *H04W 52/36* (2013.01); *H04W 72/0406* (2013.01)

(58) Field of Classification Search
None
See application file for complete search history.

(56) References Cited

U.S. PATENT DOCUMENTS

| | | | |
|---|---|---|---|
| 2017/0251456 A1* | 8/2017 | Radulescu | H04W 74/002 |
| 2018/0110074 A1 | 4/2018 | Akkarakaran et al. | |
| 2018/0279186 A1* | 9/2018 | Park | H04W 36/30 |
| 2018/0279376 A1* | 9/2018 | Dinan | H04W 52/50 |
| 2019/0373642 A1 | 12/2019 | Suzuki et al. | |
| 2020/0100297 A1 | 3/2020 | Agiwal et al. | |
| 2020/0107277 A1* | 4/2020 | Jeon | H04W 52/36 |
| 2020/0120713 A1* | 4/2020 | Yerramalli | H04L 5/0044 |
| 2020/0146054 A1 | 5/2020 | Jeon et al. | |
| 2020/0146069 A1 | 5/2020 | Chen et al. | |
| 2020/0221504 A1 | 7/2020 | Cirik et al. | |

(Continued)

FOREIGN PATENT DOCUMENTS

| | | |
|---|---|---|
| KR | 10-2017-0139529 A | 12/2017 |
| KR | 10-2018-0117620 A | 10/2018 |

(Continued)

OTHER PUBLICATIONS

U.S. Appl. No. 62/744,043, Qualcomm, Yerramalli et al., Oct. 10, 2018 (Year: 2018).*

(Continued)

*Primary Examiner* — The Hy Nguyen
(74) *Attorney, Agent, or Firm* — Kowert, Hood, Munyon, Rankin & Goetzel, P.C.

(57) ABSTRACT

Apparatuses, systems, and methods for a wireless device to perform 2-step random access procedures. The disclosure identifies features of 2-step random access procedures including configuration (e.g., under what circumstances to use 2-step vs. 4-step random access), message design, fallback procedures, power ramping, backoff, and retransmission procedures.

20 Claims, 23 Drawing Sheets

(56) References Cited

U.S. PATENT DOCUMENTS

| | | | | |
|---|---|---|---|---|
| 2020/0252974 | A1* | 8/2020 | Akkarakaran | H04W 52/36 |
| 2020/0260485 | A1* | 8/2020 | Lei | H04W 72/14 |
| 2020/0404711 | A1* | 12/2020 | Zhao | H04W 80/02 |
| 2021/0136827 | A1* | 5/2021 | Xiong | H04L 5/0044 |
| 2021/0219349 | A1* | 7/2021 | Huang | H04W 74/0833 |
| 2021/0329704 | A1* | 10/2021 | Yang | H04B 17/318 |
| 2022/0124818 | A1* | 4/2022 | Lee | H04W 52/36 |

FOREIGN PATENT DOCUMENTS

| | | | |
|---|---|---|---|
| WO | 2018085726 | A1 | 5/2018 |
| WO | 2018135640 | A1 | 7/2018 |
| WO | WO 2018/127549 | | 7/2018 |

OTHER PUBLICATIONS

Notice of Preliminary Rejection for KR Application 10-2020-0016115, dated Mar. 4, 2021.

LG Electronics. Inc., "2-Step RACH procedure for NR-U", 3GPP TSG RAN WG2 #103 bis, R2-1818098, Spokane, USA, dated Nov. 2, 2018.

Extended European Search Report, Application No. 2157157.7-1215, Apple Inc., dated Jun. 5, 2020, eleven pages.

Intel Corporation, "2-step CBRA for NR licensed and unlicensed operation," 3GPP Draft; R2-1813988-2STEPRA-NRU_V00, 3rd Generation Partnership Project, Cedex, France, vol. RAN WG2, No. Chengdu, China, Sep. 28, 2018, XP051523452, five pages.

Interdigital, "2-Step RACH Procedure," DGPP Draft; R2-1814008 (R15 NRU SI AI 11211 2-Step RACH), 3rd Generation Partnership Project, Cedex France, vol. RAN WG2, No. Chengdu China, Sep. 27, 2018, XP051523471, 5 pages.

Office Action for KR Patent Application No. 10-2020-0016115; dated Sep. 29, 2021.

Office Action for Chinese Patent Application No. 201910112653.1; 7 pages; dated Apr. 12, 2022.

Office Action for European Patent Application No. 20157157.7; 5 pages; dated Mar. 14, 2022.

First Examination Report for IN Patent Application No. 202014005553; 6 pages; dated May 9, 2022.

* cited by examiner

| RRC State | Msg3 MAC PDU | | TB Size |
|---|---|---|---|
| INACTIVE/IDLE UE | LCID=0/52 | CCCH SDU | 56Bits/72Bits |
| CONNECTED UE | LCID=58 | C-RNTI MAC CE | >=24Bits |

| RRC state | Msg3 content | RA trigger |
|---|---|---|
| Idle/inactive | CCCH SDU | - RRC Setup Request<br>- RRC Resume Request<br>- RRC Re-establishment Request |
| Connected | C-RNTI MAC CE<br>(CONNECTED) | - Handover<br>- DL or UL Data Arrival during RRC_CONNECTED when UL Synchronization State<br>-SR Failure;<br>-Request by RRC upon Synchronous Reconfiguration<br>-To Establish Time Alignment at SCell Addition;<br>-Request for other SI<br>-Beam Failure Recovery |

FIG. 13

| RRC Message over CCH | RRC Setup Request | RRC Resume Request | RRC SystemInfo Request |
|---|---|---|---|
| CCCH Message Size | - 48-Bit | - 48-bit & 64-bit | - 48-bit |
| Carried UE Identity | - ng-5g-s-tmsi-part1 | - 48-bit case: short I-RNTI (24bits)<br>- 64-bit case: full I-RNTI (40bits) | - N/A |
| Note | - Part1 is the rightmost 39 bits of 5G-S-TMSI (48 bits)<br>- It is included if upper layers provide an 5G-S-TMSI, otherwise, 39-bit random value is included.) | - Both I-RNTIs are configured in suspend configuration<br>- Applicable I-RNTI type is indicated in SIB1 | - N/A |

2-step RACH may not support SI request ✗

FIG. 14

```
RRCSetupRequest-IEs ::=    SEQUENCE {
    ue-Identity                InitialUE-Identity,
    establishmentCause         EstablishmentCause,
    spare                      BIT STRING (SIZE (1))
}

InitialUE-Identity ::=     CHOICE {
    ng-5G-S-TMSI-Part1         BIT STRING (SIZE (39) },
    randomValue                BIT STRING (SIZE (39) }
    spare
}
        48-Bit
```

FIG. 15

```
RRCResumeRequest-IEs ::=    SEQUENCE {
    resumeIdentity          ShortI-RNTI-Value,
    resumeMAC-1             BIT STRING (SIZE (16)),
    resumeCause             ResumeCause,
    spare                   BIT STRING (SIZE (1))
}                           48-Bit
```

FIG. 16

```
RRCResumeRequest-IEs ::=    SEQUENCE {
    resumeIdentity          I-RNTI-Value,
    resumeMAC-1             BIT STRING (SIZE (16)),
    resumeCause             ResumeCause,
    spare                   BIT STRING (SIZE (1))
}                           64-Bit
```

FIG. 17

```
Rrc-ConfiguredUplinkGrant    SEQUENCE {
    timeDomainOffset                    INTEGER (0..5119),
    timeDomainAllocation                INTEGER (0..15),
    frequencyDomainAllocation           BIT STRING (SIZE (18)),
    antennaPort                         INTEGER (0..31),
    dmrs-SeqInitialization              INTEGER (0..1),
    precodingAndNumberOfLayers          INTEGER (0..63),
    srs-ResourceIndicator               INTEGER (0..15),
    mcsAndTBS                           INTEGER (0..31),
    frequencyHoppingOffset              INTEGER (0.. maxNrofPhysicalResourceBlocks-1)
    pathlossReferenceIndex              INTEGER (0.. maxNrofPUSCH-PathlossReferenceRSs-1),
    ...
}
```

FIG. 19

| RRC State | MsgA-MAC PDU | | CR MAC CE in MsgB |
|---|---|---|---|
| INACTIVE/IDLE UE | LCID=xxxx | CCCH MAC CE | CCCH MAC CE |
FIG. 28
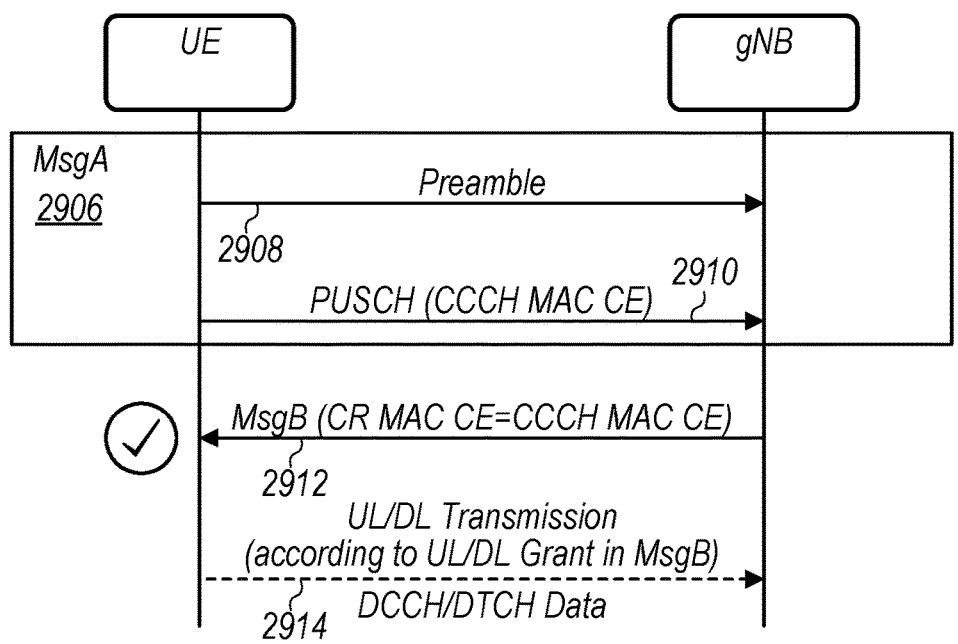
FIG. 29
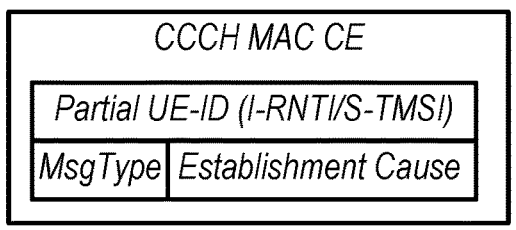
FIG. 30
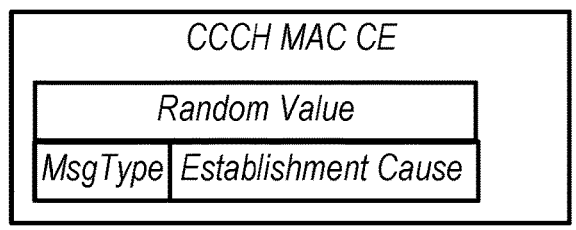
FIG. 31

| MsgB MAC RAR |
|---|
| MsgB MAC PDU |

FIG. 35

| MsgB MAC RAR |
|---|

| R | Timing Advance Command | |
|---|---|---|
| Timing Advance Command | | UL Grant |
| UL Grant | | |
| UL Grant | | |
| UL Grant | | |
| Temporary C-RNTI | | |
| Temporary C-RNTI | | |
| UE Contention Resolution Identity | | |
| UE Contention Resolution Identity | | |
| UE Contention Resolution Identity | | |
| UE Contention Resolution Identity | | |
| UE Contention Resolution Identity | | |
| UE Contention Resolution Identity | | |

FIG. 36

2-STEP RANDOM ACCESS

PRIORITY CLAIM

This application claims priority to Chinese patent application number 201910112653.1, entitled "2-Step Random Access," filed Feb. 13, 2019, which is hereby incorporated by reference in its entirety as though fully and completely set forth herein.

FIELD

The present application relates to wireless devices, and more particularly to apparatus, systems, and methods for performing 2-step random access.

DESCRIPTION OF THE RELATED ART

Wireless communication systems are rapidly growing in usage. Further, wireless communication technology has evolved from voice-only communications to also include the transmission of data, such as Internet and multimedia content. Random access procedures may typically include four messages (e.g., four steps). Thus, improvements in the field are desired.

SUMMARY

Embodiments relate to apparatuses, systems, and methods to perform random access (RA) procedures using two messages (e.g., two steps, e.g., instead of previous four step processes). Embodiments include configuration for 2-step RA, MsgA design, MsgB design, mechanisms for falling back to 4-step RA, and 2-step RA retransmission, among other features. Embodiments may reduce the latency and/or signaling overhead associated with RA.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 13 illustrates random access triggers, according to some embodiments;

FIGS. 14-17 illustrate uplink control channel service data units, according to some embodiments;

FIGS. 18 and 19 illustrate 2-step random access configuration, according to some embodiments;

FIG. 20 illustrates a 2-step random access procedure, according to some embodiments;

FIGS. 21-31 illustrate MsgA design, according to some embodiments;

FIGS. 32-36 illustrate MsgB design, according to some embodiments; and

Figure 1:
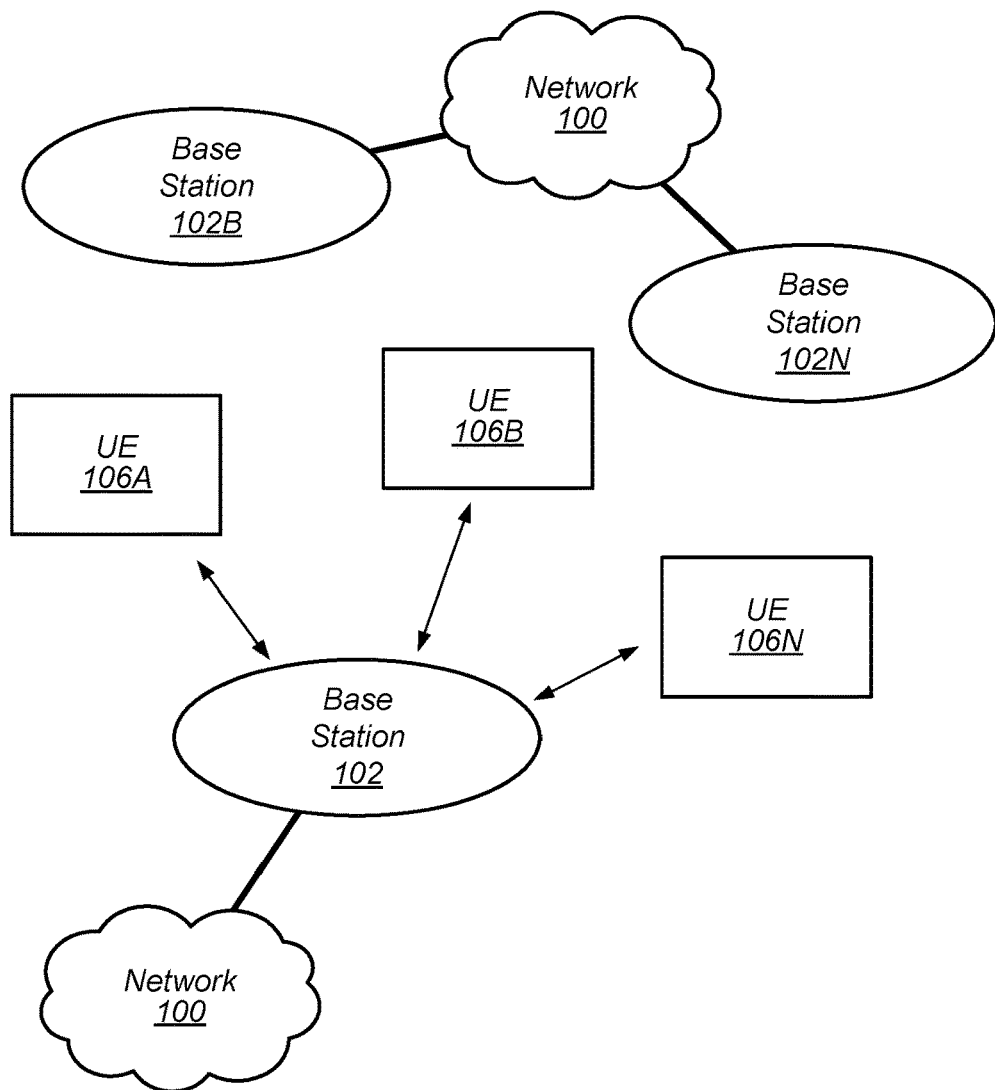
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
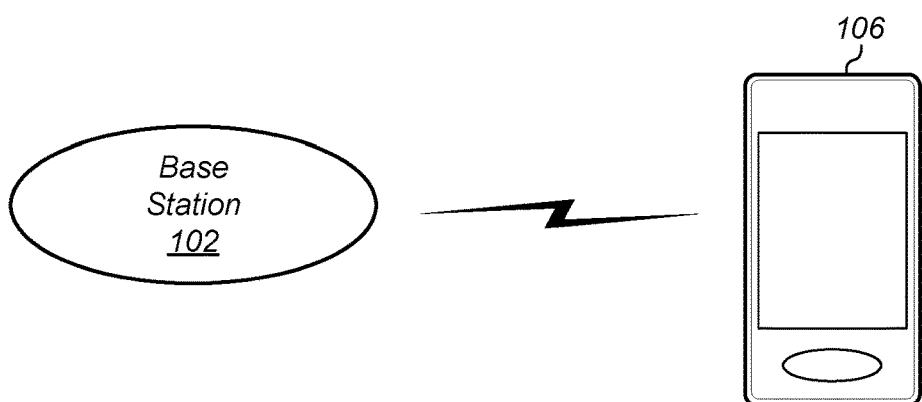
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 3:
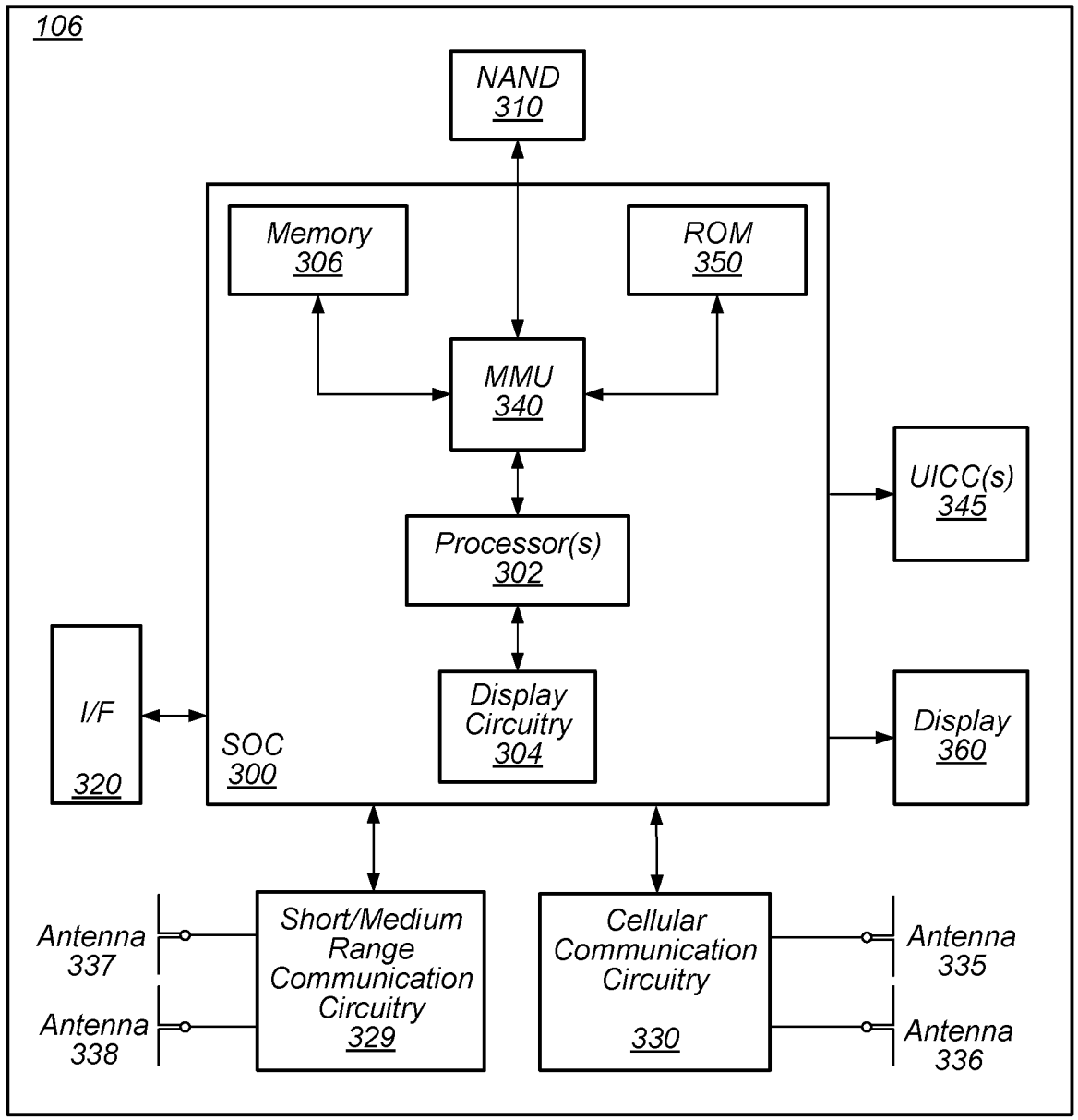
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements/processors may be included in cellular communication circuitry 330 and, similarly, one or more processing elements/processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
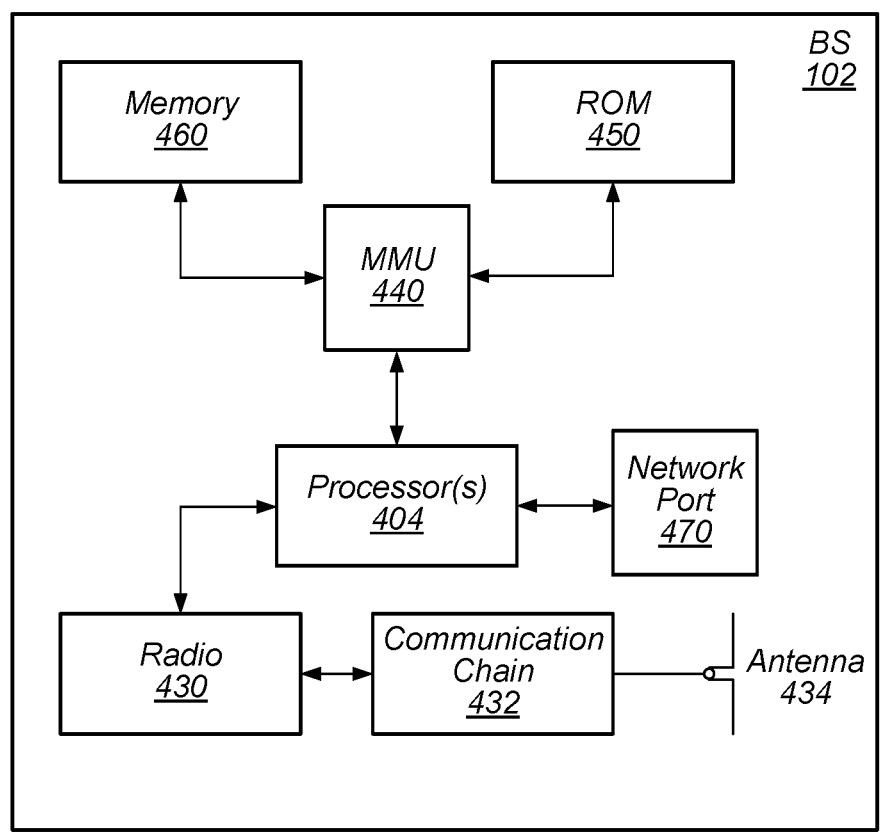
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
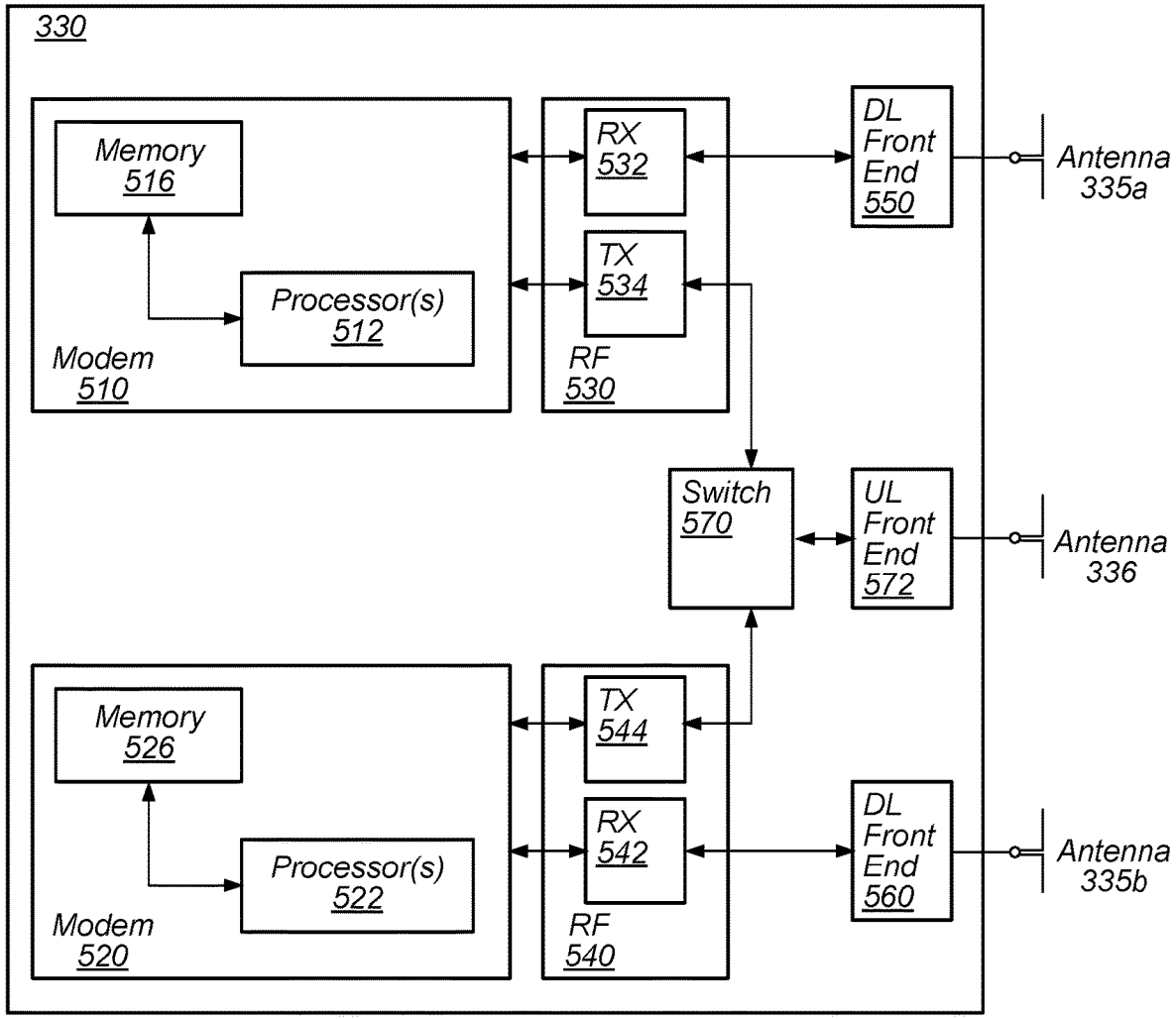
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
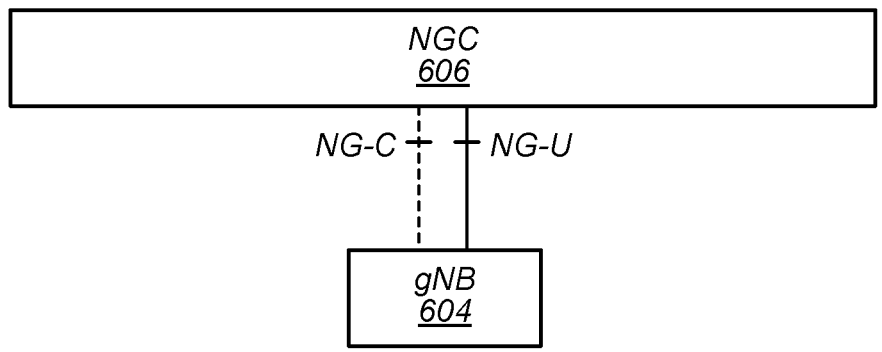
FIGS. 6 and 7 illustrate examples of a 5G NR base station (gNB), according to some embodiments.
Figure 7:
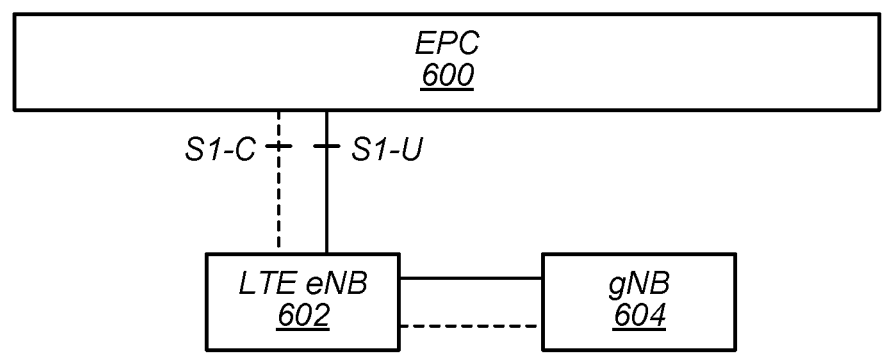

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
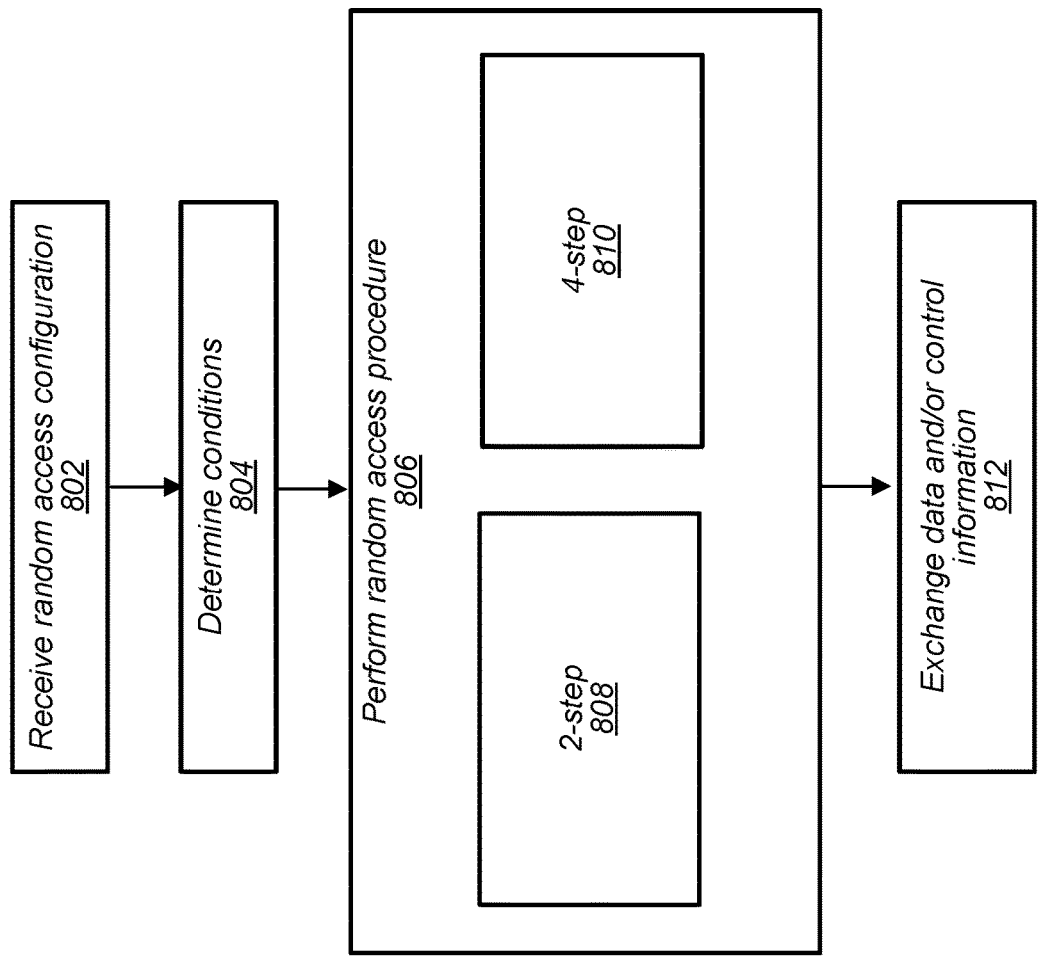
FIG. 8 illustrates techniques for 2-step random access, according to some embodiments.

FIG. 8—2-Step Random Access

A 4-step random access (RA) procedure (e.g., random access channel (RACH)) may be used to initiate, resume, setup, or reestablish a connection (e.g., a radio resource control (RRC) connection) between a UE and a BS, e.g., in LTE. Newer wireless standards, e.g., NR, may seek to reduce latency and/or signaling overhead by using a 2-step RA procedure, under at least some circumstances. However, various features of 2-step RA procedures including configuration (e.g., under what circumstances to use 2-step vs. 4-step RA), message design, fallback procedures, power ramping, backoff, and retransmission procedures have not yet been determined.

FIG. 8 illustrates exemplary techniques for performing 2-step RA including configuration, message design, fallback, and retransmission procedures. Aspects of the method of FIG. 8 may be implemented by a wireless device, such as the UE(s) 106, in communication with one or more base stations (e.g., BS 102) as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.) or base station (e.g., processor(s) 404, or a processor associated with radio 430 and/or communication chain 432, among various possibilities) may cause the UE or base station (respectively) to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. Similarly, although some elements of the method are described in a manner relating to the measurement and reporting of a downlink channel (e.g., by a UE reporting to a base station), the method may also be applied in the reverse (e.g., a base station measuring an uplink channel). Further, the method may be applied in other contexts (e.g., between multiple UEs, e.g., in device-to-device communications). In various embodiments, some of the elements of the methods shown may be performed concurrently, in a different order than shown, may be substituted for by other method elements, or may be omitted. Additional method elements may also be performed as desired. As shown, the method may operate as follows.

A wireless device (e.g., UE 106) may receive RA configuration information (802). The RA configuration information may include condition configuration information and/or RA procedure configuration information, among various possibilities. The RA configuration information may apply to 2-step RA and/or 4-step RA. The RA configuration information may be transmitted by a BS (e.g., BS 102, e.g., a gNB). For example, the UE may receive one or more system information blocks (SIB) such as one or more SIB1s transmitted by the BS to provide the RA configuration information. Additionally, or alternatively, the UE may receive the RA configuration information via RRC dedicated signaling.

The RA procedure configuration information may indicate resources (e.g., time and/or frequency resources on a physical random access channel (PRACH)) for use for transmitting and receiving RA messages. The RA configuration may identify resources for any of various RA messages, including message 1 (Msg1), Msg2, Msg3, Msg4, MsgA, and/or MsgB. Msg1-Msg4 (described with reference to, for example, FIG. 9) may be useful for 4-step RA and MsgA and MsgB (described with reference to, for example, FIG. 20) may be useful for 2-step RA. For example, the RA configuration information may identify some PRACH resources/occasions for preamble (e.g., RACH preamble, PRACH preamble, sequence, etc.) transmission (e.g., Msg1) in a 4-step RA procedure and identify resources/occasions for preamble transmission (e.g., MsgA) in a 2-step RA procedure. The PRACH resources for Msg1 may be the same or different from the PRACH resources for MsgA. The PRACH resources for either or both Msg1 and MsgA may depend on various factors, e.g., RRC state of the UE, triggering event for the RA attempt, etc.

The RA procedure configuration information may indicate one or more schemes for determining resources for later messages based on the resources used for preamble transmission. For example, the RA configuration may indicate resources for MsgB in response to MsgA (e.g., based on the resources used for MsgA) in a 2-step RA process and may similarly indicate resources for Msg2 in response to Msg1 (e.g., based on the resources used for Msg1) in a 4-step RA process. The scheme for determining MsgB resources may be the same or different from the scheme for determining Msg2 resources.

The RA procedure configuration information may indicate one or more schemes for determining any of various identifiers. For example, the schemes may indicate how to determine identifiers such as radio network temporary identifiers (RNTI) of various types, e.g., cell-RNTI (C-RNTI), temporary C-RNTI (T-C-RNTI), RA-RNTI, MsgB-RNTI, etc. The schemes may further indicate how to determine other types of identifiers, e.g., contention resolution (CR) identifiers, among various possibilities. Such schemes may be the same or different for 4-step RA and 2-step RA.

The RA procedure configuration information may specify (e.g., or specify conditions for determining) which of various configuration options should be used for MsgA and/or MsgB of a 2-step RA procedure. Various configuration options are explained in further detail below with respect to FIG. 20.

The RA configuration information may include condition configuration information to indicate one or more criteria or conditions for determining whether to use 2-step RA vs. 4-step RA. The conditions may include one or more of: RA trigger, radio conditions, RRC state (e.g., connected, idle, inactive, C-DRX, etc.), whether the UE is or is not synchronized (e.g., has a valid TA value), type of UE, motion of the UE, location of the UE, and/or a retransmission criterion (e.g., whether the RA attempt is an initial transmission or a retransmission and potentially a number of previous retransmissions, if the RA attempt is a retransmission), etc.

The RA procedure configuration information may indicate one or more fallback criterion. A fallback criterion may specify under what conditions a UE should fallback from 2-step RA to 4-step RA. For example, a fallback criterion may specify that a UE should fallback to 4-step RA based on receiving a specified message indicating a fallback (e.g., Msg2, e.g., rather than a MsgB) in response to a MsgA. Similarly, a fallback criterion may specify that a UE should fallback to 4-step RA based on not receiving any response (e.g., MsgB or Msg2) to one (or a higher number, as desired) MsgA transmission within a certain amount of time. The amount of time may be a specified window, e.g., an RA response (RAR) window. Still further, a fallback criterion may specify a different message (e.g., a single purpose message, a field in another message, etc.) to direct the UE to fallback to 4-step RA.

The UE may determine conditions, e.g., as necessary to evaluate any of the various criteria included in the RA configuration information (804).

For example, the conditions may include determining the RA trigger, e.g., for what purpose the RA procedure is to be performed (e.g., setting-up, establishing, or resuming an RRC connection, or to perform various actions such as handover, synchronization, etc.). FIG. 13 provides more details on RA triggers.

As another example, the UE may determine whether the RA attempt is a retransmission. If so, the UE may further determine a number of previous RA attempt retransmissions. Further, the UE may determine the type(s) (e.g., 2-step or 4-step) of one or more previous RA attempts.

Determining conditions may also involve performing one or more measurements, e.g., of radio conditions. The measurements may continue (e.g., periodically, randomly, as needed, etc.) for any amount of time. For example, the measurements may occur over any number of subframes and/or symbols. The measurements may include any radio link measurements such as signal-noise ratio (SNR), signal to interference and noise ratio (SINR), reference signal received power (RSRP), reference signal received quality (RSRQ), received signal strength indicator (RSSI), channel impulse response (CIR), channel error response (CER), etc. The UE may retain a history of measurement values. The UE may compare the measurement values, or metrics calculated based on the measured values, to one or more thresholds, e.g., based on the RA configuration information. The UE may use various parameters, e.g., for hysteresis, in such comparisons.

The UE may determine various connection related conditions, e.g., RRC state and synchronization status (e.g., is the UE connected, is its timing advance (TA) value valid/current, etc.

The UE may further determine any of various other conditions, e.g., related to the type of UE (e.g., criteria for 2-step RA may be different for low power, link-budget limited, or machine-type communication devices relative to other, more fully featured devices), motion of the UE, location of the UE, etc.

The UE may perform an RA procedure (806) based on the determined conditions. For example, the UE may evaluate the determined conditions relative to the criterion or criteria of the condition configuration information to determine whether to perform a 2-step or 4-step RA procedure. In other words, the UE may determine that 2-step RA is triggered based on the current conditions in comparison to the condition configuration information. If 2-step RA is triggered, the UE may initiate and perform 2-step RA (808). Otherwise, the UE may initiate and perform 4-step RA (810). Various embodiments of 4-step RA procedures (810) are described in more detail with respect to FIGS. 9-12 and various embodiments of 2-step RA procedures (808) are described in more detail with respect to FIGS. 18-36.

Additionally, the UE may further evaluate the determined conditions relative to criteria for applying related techniques, such as fallback (see FIGS. 37 and 38), backoff, power ramping, etc.

The UE may exchange data and/or control information with the BS (812) in the uplink (UL) and/or downlink (DL) direction(s). Such exchanges may use one or more dedicated logical channels, among various possibilities.

FIGS. 9-12-4-Step Random Access

Figure 9:
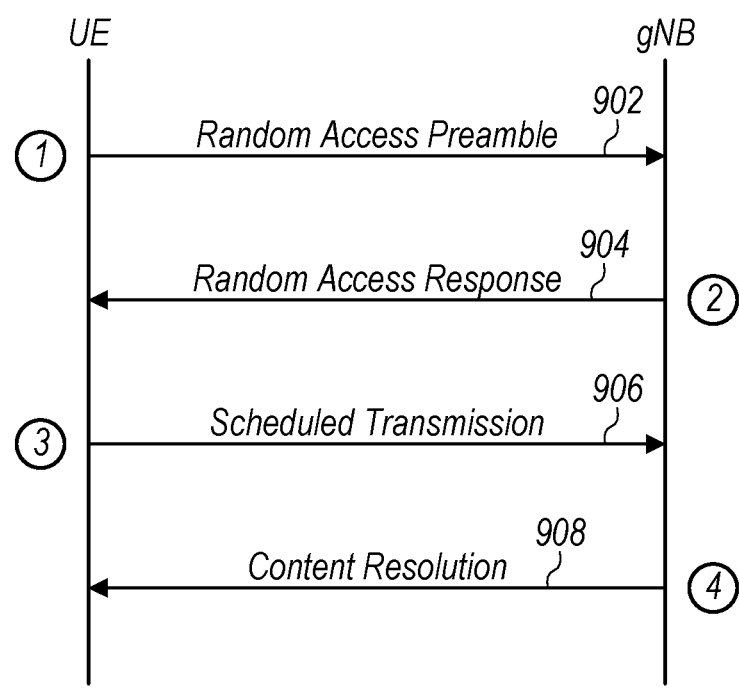
FIGS. 9-12 illustrate 4-step random access, according to some embodiments.

FIGS. 9-12 illustrate aspects of 4-step RA, according to some embodiments. FIG. 9 illustrates the 4-step RA process, according to some embodiments. A wireless device (e.g., UE 106) may transmit a RA preamble to a gNB (e.g., BS 102) (902). The preamble may be referred to as Msg1 (e.g., message 1). Physical RA channel (PRACH) resource/preamble may be configured via system information block 1 (SIB1) or RRC dedicated signaling. Multiple preambles may be transmitted on one PRACH resource. The UE may select the PRACH occasion and preamble for Msg1 transmission.

The BS may respond to the preamble with a RA response (RAR) (904). The RAR may be referred to as Msg2. Msg2 may be transmitted using a RA radio network temporary identifier (RA-RNTI) associated with the PRACH occasion in which the preamble is transmitted. The RA-RNTI may be calculated as: RA RNTI=1+s_id+14* t_id+14*80*f_id+ 14*80*8*ul_carrier_id, where s_id is a symbol index (e.g., the index of the first OFDM symbol of the PRACH occasion ($0 \leq s\_id < 14$)), t_id is a slot index (e.g., the index of the first slot of the PRACH occasion in a system frame ($0 \leq t\_id < 80$)), f_id is a frequency index (e.g., the index of the PRACH occasion in the frequency domain ($0 \leq f\_id < 8$)), and ul_carrier_id is an index of the carrier used for transmitting the preamble. The UE may monitor the physical downlink control channel (PDCCH) masked by RA-RNTI within a RAR window (e.g., from the time of the transmission of the preamble). Based on detecting its preamble (e.g., RAPID) in the RAR, the UE may consider Msg2 reception successful.

Figure 10:
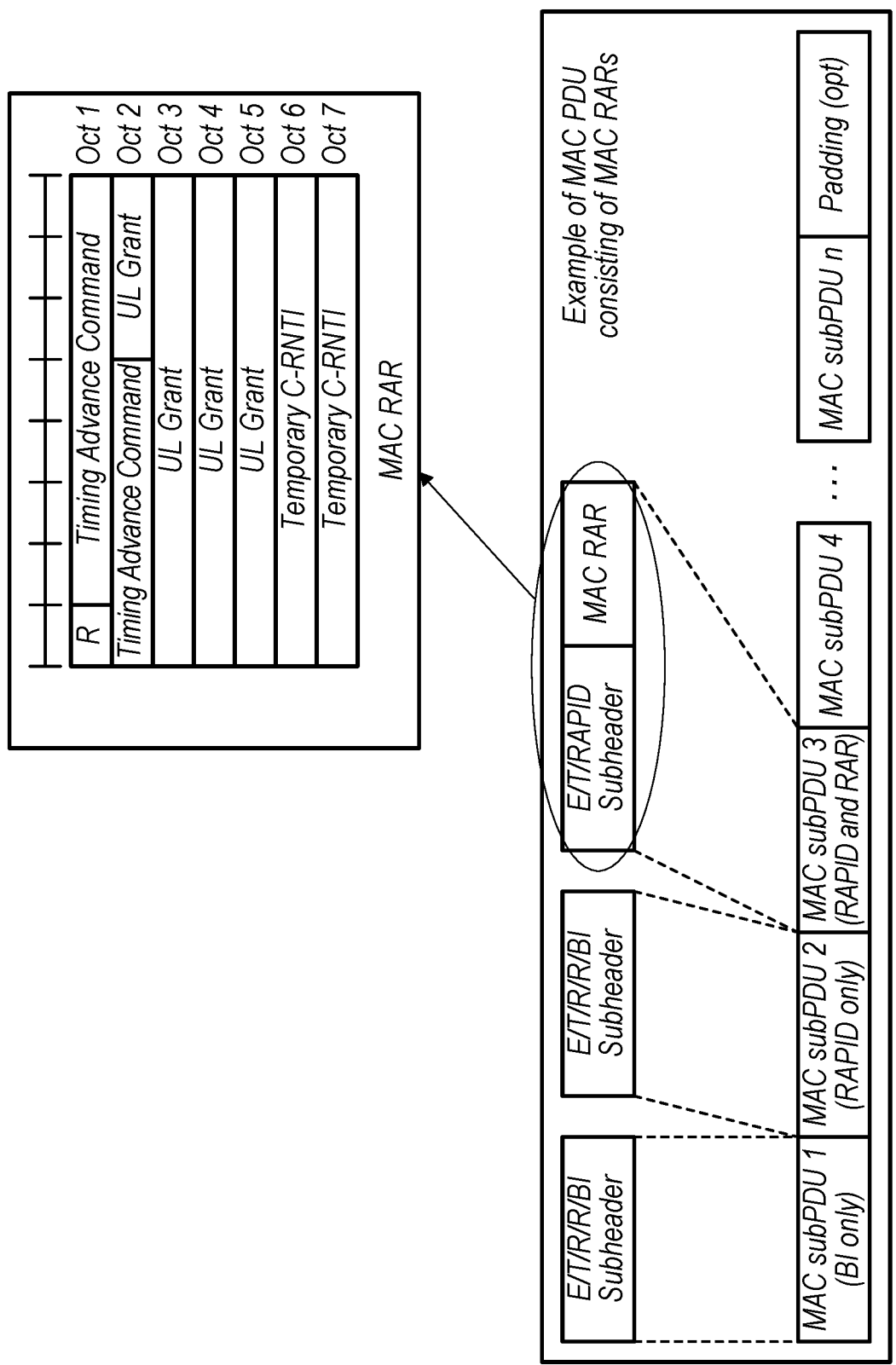

FIG. 10 illustrates Msg2, according to some embodiments. The BS may transmit a media access control (MAC) protocol data unit (PDU) consisting of one or more MAC subPDUs. Each subPDU may include a subheader indicating whether the subPDU includes backoff indication (BI), a RA preamble (RAPID), and/or a RAR. The MAC RAR PDU may include multiple MAC subPDUs (e.g., RAPID and MAC RAR). In the illustrated example, subPDU 3 may include a MAC RAR. The exemplary, illustrated MAC RAR may include 7 octets (October). The first octet may include R (e.g., a reserved bit) and a timing advance (TA) command. The TA command may serve to synchronize the UE and the network. The second octet may include the remainder of the TA command and a portion of an uplink (UL) grant. The remainder of the UL grant may be included in octets 3-5. The $6^{th}$ and $7^{th}$ octets may include a temporary cell radio network temporary identifier (T-C-RNTI). Based on detecting its preamble (e.g., RAPID) in the RAR, the UE may consider Msg2 reception successful and may apply the timing advance value from the TA command for UL synchronization with the network.

Returning to FIG. 9, the UE may respond to the RAR with a scheduled transmission (906). The scheduled transmission may be referred to as Msg3. The UE may transmit Msg3 according to the UL grant in the RAR. The UE may monitor PDCCH masked by T-C-RNTI for potential Msg3 retransmission (e.g., for an indication from the BS to retransmit Msg3).

Figures 11, 12:
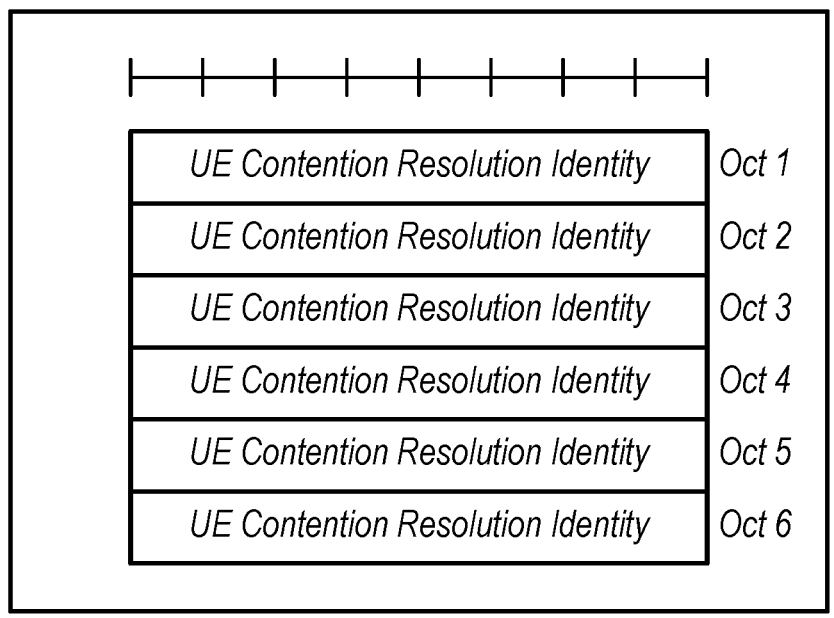

FIG. 11 illustrates the contents of Msg3, according to some embodiments. For a UE in an inactive or idle RRC state, the Msg3 may include a logical channel identifier (LCID) and a common control channel (CCCH) service data unit (SDU). LCID values of 0 or 52 may indicate the length of the CCCH SDU. The total transport block (TB) size may be 56 or 72 bits, among various possibilities.

For a UE in the connected RRC state, the Msg3 may include an LCID (e.g., with a value of 58) and a C-RNTI MAC control element (CE). The TB size may be greater than or equal to 24 bits, among various possibilities.

Returning to FIG. 9, the BS may respond to the scheduled transmission with a contention resolution (908). The contention resolution may be referred to as Msg4.

A connected UE may monitor PDCCH masked by C-RNTI. If a contention resolution is received the RA procedure may be a success.

An idle/inactive UE may monitor PDCCH masked by T-C-RNTI. A MAC PDU (e.g., Msg4) may include the contention resolution (CR) MAC CE. If a received CR MAC CE matches transmitted CCCH SDU, the RA procedure may be a success. Msg4 is illustrated and described in further detail with respect to FIG. 12.

FIG. 12 illustrates a CR MAC CE (e.g., CR identity MAC CE), according to some embodiments. As shown, the CR MAC CE may include six octets. All of the octets may (e.g., collectively) provide a CR identity for the UE.

FIG. 13—Random Access Triggers

FIG. 13 illustrates RA triggers and associated Msg3 content, according to some embodiments. An idle or inactive UE may transmit a CCCH SDU as Msg3. CCCH may be used when the UE does not have a cell radio network temporary identifier (C-RNTI). RA triggers for idle/inactive UEs include: RRC setup request, RRC resume request, and RRC re-establishment request.

A connected UE may transmit a C-RNTI MAC CE as Msg3 (e.g., indicating its C-RNTI). RA triggers for connected UEs include: handover, synchronization, scheduling request (SR) failure, reconfiguration, addition of a secondary cell, request for system information, and beam failure, among various possibilities.

FIGS. 14-17—Uplink Common Control Channel Service Data Units

FIGS. 14-17 illustrate uplink (UL) common control channel (CCCH) service data units, according to some embodiments. For example, such UL CCCH SDUs may be used by idle or inactive UEs in Msg3, among various possibilities. For each RRC message type (e.g., setup request, resume request, and system information (SystemInfo) request, a CCCH message size and a carried UE identity are shown. For a setup request, the message may be 48 bits and the UE identity may be part 1 of a system architecture evolution (SAE) Temporary Mobile Subscriber Identity (S-TMSI), among various possibilities. For a resume request, the message may be either 48 or 64 bits and the UE identity may be an Inactive RNTI (I-RNTI). An I-RNTI may be allocated for each inactive UE and used to identify the UE context in RRC_inactive. According to some embodiments, an RRC SystemInfo request may not be supported in 2-step RA procedures.

FIG. 15 illustrates an exemplary 48-bit RRC setup request, including the 39 bit part 1 S-TMSI, according to some embodiments.

FIG. 16 illustrates an exemplary 48-bit RRC setup request, including the short I-RNTI, according to some embodiments.

FIG. 17 illustrates an exemplary 64-bit RRC setup request, including the full I-RNTI, according to some embodiments.

Figure 18:
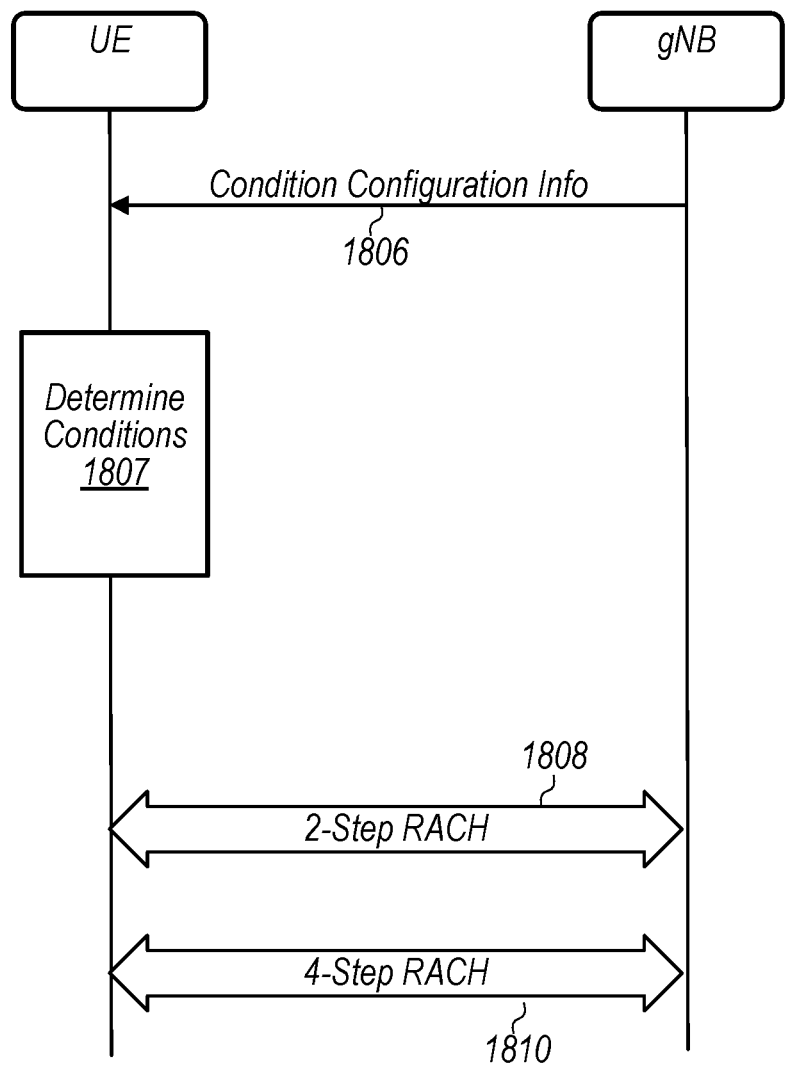

FIGS. 18 and 19—2-Step Random Access Configuration

FIG. 18 is a communication flow diagram illustrating an exemplary method of selection of a 2-step or 4-step random access procedure, according to some embodiments. A wireless device (e.g., UE 106) may receive RA configuration information from a network (e.g., BS 102) (1806). The RA configuration information may include condition configuration information and/or RA procedure configuration information.

The condition configuration information may specify conditions under which the UE should use a 2-step RA procedure and/or conditions under which the UE should use a 4-step RA procedure. The conditions may include one or more of: RA trigger, radio conditions, whether the UE is or is not connected and/or synchronized (e.g., has a valid TA value), and/or whether the RA attempt is a retransmission, etc. For example, the conditions may specify that (e.g., based on RA trigger) a RA attempt to resume an RRC connection should use a 2-step RA procedure, but an RA attempt to perform initial establishment of an RRC connection should use a 4-step RA procedure, or vice versa. Similarly, the conditions may specify that if a UE is connected and synchronized to the network, that it should use a 2-step RA procedure (e.g., for some or all RA triggers), while an idle, inactive, or non-synchronized UE should use a 4-step RA procedure (e.g., for at least some of the same RA triggers). As another example, the conditions may specify that for one or more RA triggers, the UE should use the 2-step RA procedure if radio conditions (e.g., as measured by RSRP, SNR, SINR, RSRQ, CQI, CSI, etc.) are better than a threshold (e.g., RSRP=x dB or SNR=y), but should use the 4-step RA procedure for the one or more RA triggers if the radio conditions are equal to or worse than the threshold. Further, the conditions may specify different (or the same) conditions or combinations of transmissions for an initial RA procedure vs. a retransmission of an RA message (e.g., RACH retransmission).

The RA procedure configuration information may specify (e.g., or specify conditions for determining) which of various configuration options should be used for MsgA and/or MsgB of a 2-step RA procedure. Various configuration options are explained in further detail below with respect to FIG. 20.

The UE may evaluate current conditions (e.g., perform measurements, determine an RA trigger, etc.) in comparison to the condition configuration information (1807). Based on the comparison, the UE may select to perform a 2-step RA procedure (1808) or 4-step RA procedure (1810).

PRACH resource/preamble and associated physical uplink shared channel (PUSCH) resources may be configured by the BS and/or UE for 2-step RA procedures. For example, the BS may transmit information on PRACH resources, preambles, and related PUSCH resources (e.g., for 2-step RA) in one or more system information blocks. FIG. 19 illustrates a PUSCH resource configuration similar to an RRC configured UL grant (e.g., RRC-configuredUL-grant). Such a configuration may be useful for a 2-step RA procedure. PUSCH resource configuration may be PRACH/preamble specific. Preamble and PUSCH resources may be time-division multiplexed (TDM).

Figures 20, 21:
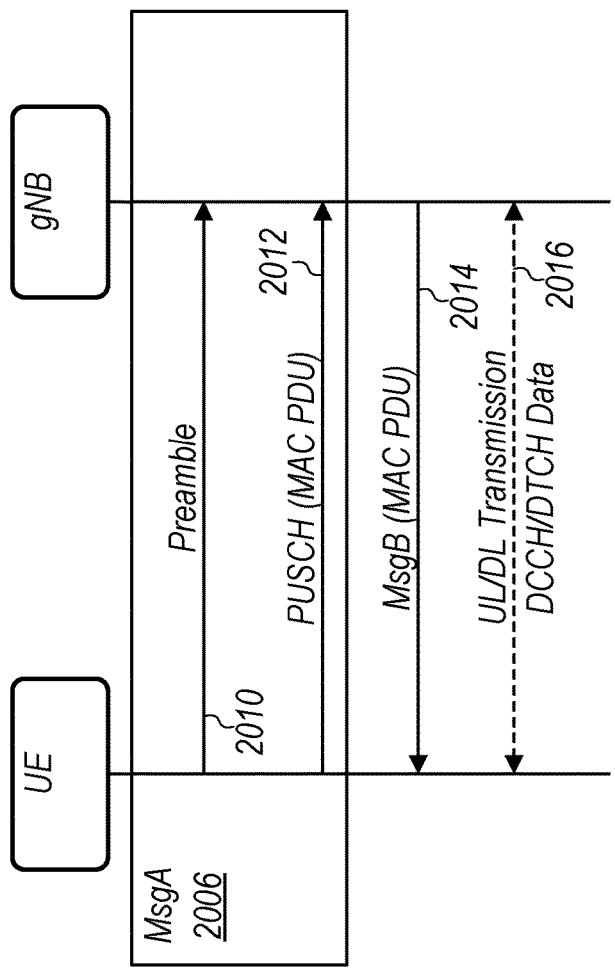

FIGS. 20—2-Step Random Access Procedure

FIG. 20 illustrates a 2-step RA procedure (e.g., as in 1808 of FIG. 18, described above), according to some embodiments. A wireless device (e.g., UE 106) may transmit MsgA to a BS (e.g., BS 102) (2006). The MsgA may include a preamble (2008) and a MAC PDU transmitted on a PUSCH (2010). The preamble and MAC PDU may be transmitted concurrently or sequentially (e.g., with or without a time interval in between the transmissions) on one or more frequencies. Based on determining to perform a 2-step RA procedure (e.g., as in 1807), the UE may select the next available PRACH resource, and may (e.g., randomly) select a preamble for transmission of MsgA (2008). The PRACH/preamble selection may be selected from within the PRACH/preamble resource pool for 2-step RACH. The UE may transmit the MAC PDU (2010) via the MsgA-PUSCH resource associated to the selected PRACH/preamble. According to various embodiments, the MsgA-MAC PDU may include different content as discussed below. Note that these options are not limiting and are only provided as examples Option 1: MsgA includes the same content as Msg3 of 4-step RA procedure as illustrated in FIG. 11 (e.g., if payload size is big enough). In other words, if the allocated transport block (TB) size (e.g., MAC PDU size) for the MsgA data transmission is equal to or larger than a threshold size. For example, the threshold size may be 56 or 72 bits (or 24 bits for connected UEs). This option is further described below and illustrated in FIGS. 21-27.

Option 2: MsgA includes a portion of the Msg3 content. At least some of the Msg3 content may be excluded from MsgA. This option may be particularly useful for idle or inactive UEs. This option is further described below and illustrated in FIGS. 28-31.

After transmitting MsgA, the UE may start monitoring for MsgB within a 2-step RAR window. The 2-step RAR window may be determined based on received RA configuration information, network configuration, definitions in a standard, etc. The BS may respond with a MsgB (2012). According to various embodiments, MsgB may be scheduled as discussed below. Note that these options are not limiting and are only provided as examples and may be combined with any set of options or embodiments described above:

Option 1: MsgB may be scheduled by PDCCH masked by C-RNTI (e.g., for a connected UE). The scheduled MsgB may include TA information (e.g., for UL synchronization, e.g., TA MAC CE). MsgB may also include one or more UL and/or DL grant(s) or assignments for transmission and/or reception after MsgB. In other words, during the RA procedure, a connected UE may report a C-RNTI MAC CE to the network via MsgA and the network may perform PDCCH scheduling (e.g., MsgB) masked by C-RNTI. This option is further described below and illustrated in FIG. 32.

Option 2: MsgB may be scheduled by PDCCH masked by a MsgB-RNTI. Such a MsgB-RNTI may be associated with the resources used to transmit the MsgA (e.g. associated with the PRACH resource, or the PRACH and preamble resource). For example, the MsgB-RNTI may be determined based on received RA configuration information, network configuration, definitions in a standard, etc. This option may be used for idle and/or inactive UEs, e.g., and may not be used for active UEs. MsgB may include any or all of: a contention resolution MAC CE, TA information (e.g., for UL synchronization, e.g., TA MAC CE), one or more UL and/or DL grant(s) or assignments for transmission and/or reception after MsgB. and/or a T-C-RNTI. This option is further described below and illustrated in FIGS. 33-36.

Table 1 below summarizes the options for MsgA and MsgB for different RRC states, according to some embodiments:

|  | MsgA - PUSCH design | MsgB - transmission design |
| --- | --- | --- |
| Connected UE | Option 1 or Option 2 | Option 1 or Option 2 |
| Idle/inactive UE | Option 1 or Option 2 | Option 2 |

In some embodiments, MsgB may include TA information (e.g., for both option 1 and option 2). For option 2, a UL/DL grant (e.g., after MsgB or associated with MsgB) and T-C-RNTI may also be included, according to some embodiments. For option 1, the UL/DL grant and T-C-RNTI may or may not be included.

Based on receiving the MsgB, the UE may determine that the RA procedure is successful. Following the MsgB, the UE and the BS may exchange uplink and/or downlink data and/or control information (2016). The UE and BS may use one or more dedicated channels (e.g., Dedicated Traffic Channel (DTCH) and/or Dedicated Control Channel (DCCH), e.g., as opposed to broadcast, shared, or common channels) to exchange the data and/or control information.

FIGS. 21-31—MsgA Design

FIGS. 21-31 illustrate MsgA design, according to some embodiments.

FIGS. 21-27 illustrate MsgA design according to option 1, discussed above, e.g., MsgA may include the same content as Msg3 of a 4-step RA procedure, according to some embodiments.

FIG. 21 is similar to FIG. 11, and illustrates the contents of MsgA and MsgB for different RRC states, e.g., in context of option 1 for MsgA, according to some embodiments. As shown, for an idle or inactive UE, MsgA may include a MAC PDU with an LCID (0 or 52) and a CCCH SDU. In response, MsgB may include a CR MAC CE including some or all of the CCCH SDU. For a connected UE, MsgA may include LCID (58) and a C-RNTI MAC CE. In response, MsgB may include a CR MAC CE with scheduling based on the C-RNTI.

Figure 22:
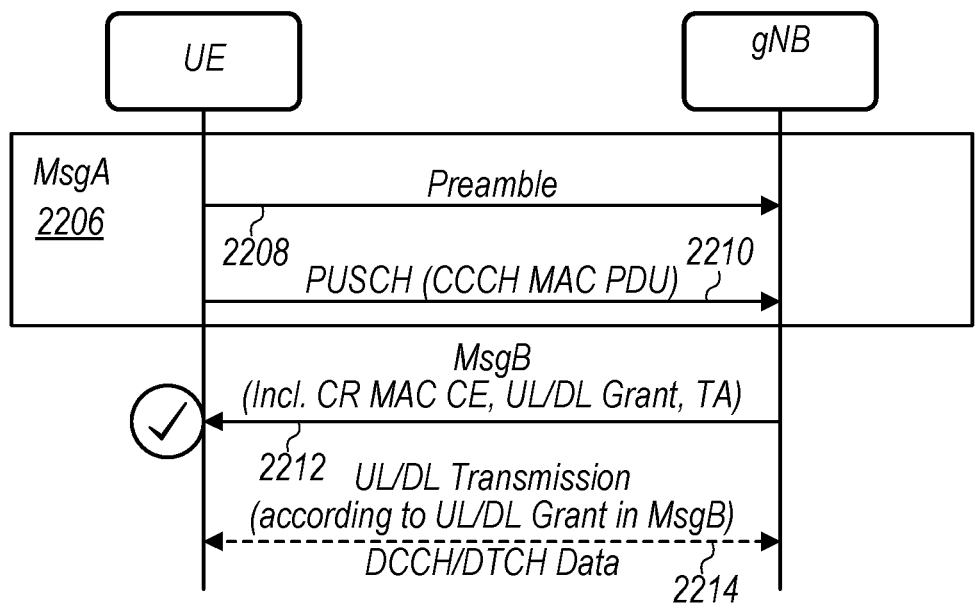

FIG. 22 is a communication flow diagram, illustrating a 2-step RA procedure for an idle or inactive UE, according to some embodiments. The UE may transmit MsgA to the gNB (2206). MsgA may include a preamble (2208) and a CCCH MAC PDU (e.g., including a CCCH SDU) on PUSCH resources (2210). In response to MsgA, the BS may respond with MsgB (e.g., including a CR MAC CE, UL/DL grant, and/or TA MAC CE) (2212). MsgB may be transmitted on a common logical channel (e.g., such as a shared physical channel). Thus, the RA procedure may be complete and successful. The UE and BS may exchange UL and/or DL data and/or control information (e.g., according to any grant(s) in MsgB) (2214). The UL/DL exchanges may occur on DCCH and/or DTCH logical channels.

Figure 23:
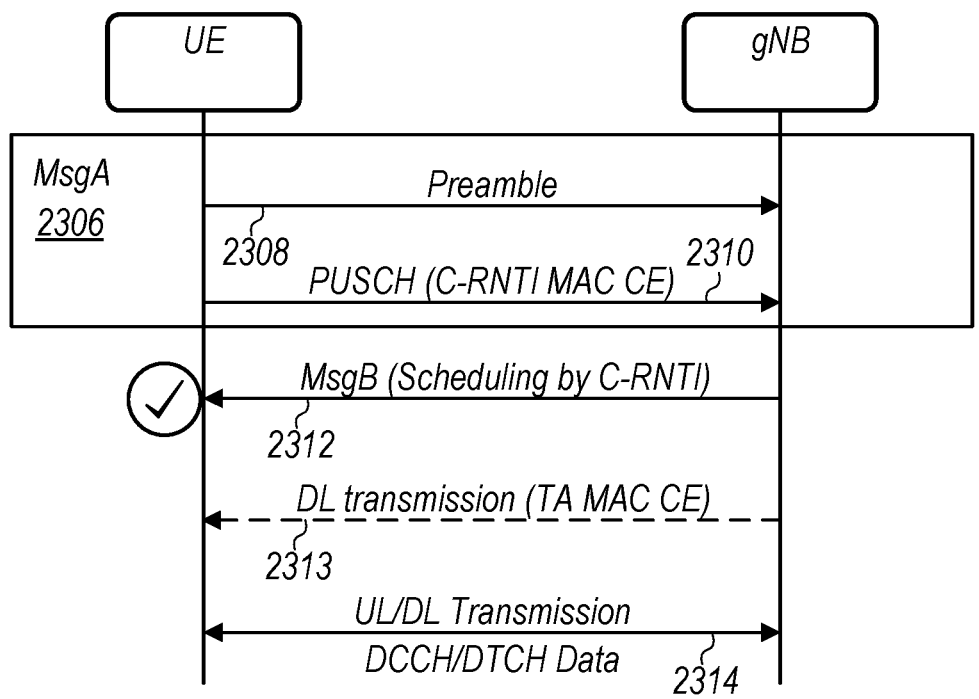

FIG. 23 is a communication flow diagram, illustrating a 2-step RA procedure for a connected UE, according to some embodiments. The UE may transmit MsgA to the gNB (2306). MsgA may include a preamble (2308) and a C-RNTI MAC CE (e.g., on PUSCH resources) (2310). In response to MsgA, the BS may respond with MsgB (e.g., including a CR MAC CE with scheduling according to the C-RNTI of the UE) (2312). MsgB may be transmitted on a common logical channel (e.g., such as a shared physical channel). Thus, the RA procedure may be complete and successful. The BS may perform a DL transmission of a TA MAC CE to update the synchronization of the UE (2313). The UE and BS may exchange UL and/or DL data and/or control information (e.g., using the C-RNTI) (2314). The UL/DL exchanges may occur on DCCH and/or DTCH logical channels.

Figure 24:
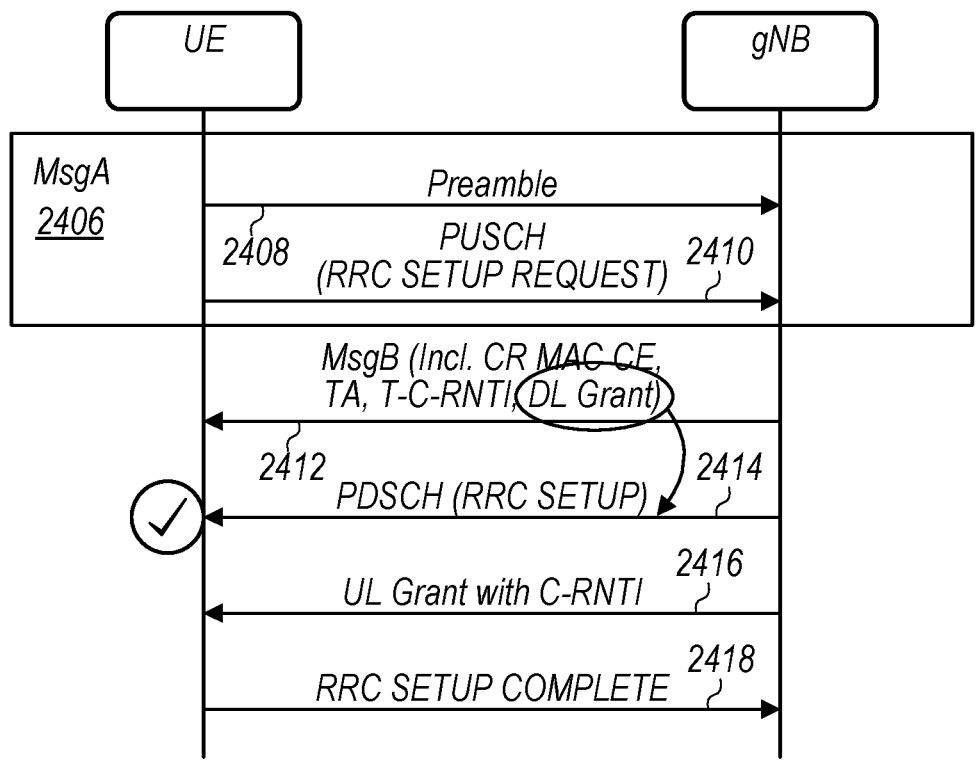

FIG. 24 is a communication flow diagram, illustrating a 2-step RA procedure for an RRC connection setup procedure, according to some embodiments. The UE may transmit MsgA to the gNB (2406). MsgA may include a preamble (2408) and an RRC setup request on PUSCH resources (2410). In response to MsgA, the BS may respond with MsgB (e.g., including a CR MAC CE, DL grant, T-C-RNTI, and/or TA MAC CE) (2412). MsgB may be transmitted on a common logical channel (e.g., such as a shared physical channel). Thus, the RA procedure may be complete and successful. The BS may also transmit an RRC setup message (e.g., on PDSCH) (2414). The PDSCH resources used for the RRC setup message may be allocated by the DL grant included in MsgB. The BS may further transmit a UL grant (e.g., including an indication of the C-RNTI of the UE, e.g., to replace the T-C-RNTI) (2416), and the UE may use the resources indicated by the UL grant to transmit an RRC setup complete message to the BS (2418).

Figure 25:
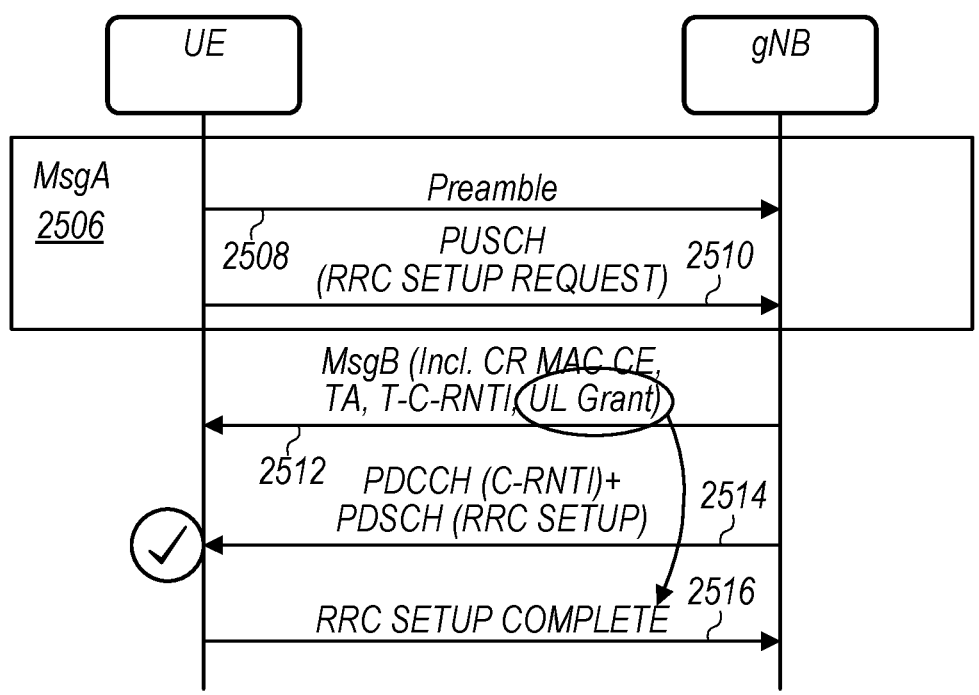

FIG. 25 is a communication flow diagram, illustrating a 2-step RA procedure for an RRC connection setup procedure, according to some embodiments. The UE may transmit MsgA to the gNB (2506). MsgA may include a preamble (2508) and an RRC setup request on PUSCH resources (2510). In response to MsgA, the BS may respond with MsgB (e.g., including a CR MAC CE, UL grant, T-C-RNTI, and/or TA MAC CE) (2512). MsgB may be transmitted on a common logical channel (e.g., such as a shared physical channel). Thus, the RA procedure may be complete and successful. The BS may also transmit an indication of the C-RNTI (e.g., on PDCCH) and an RRC setup message (e.g., on PDSCH) (2514). The UE may use the resources indicated by the UL grant in MsgB to transmit an RRC setup complete message to the BS (2516).

Figure 26:
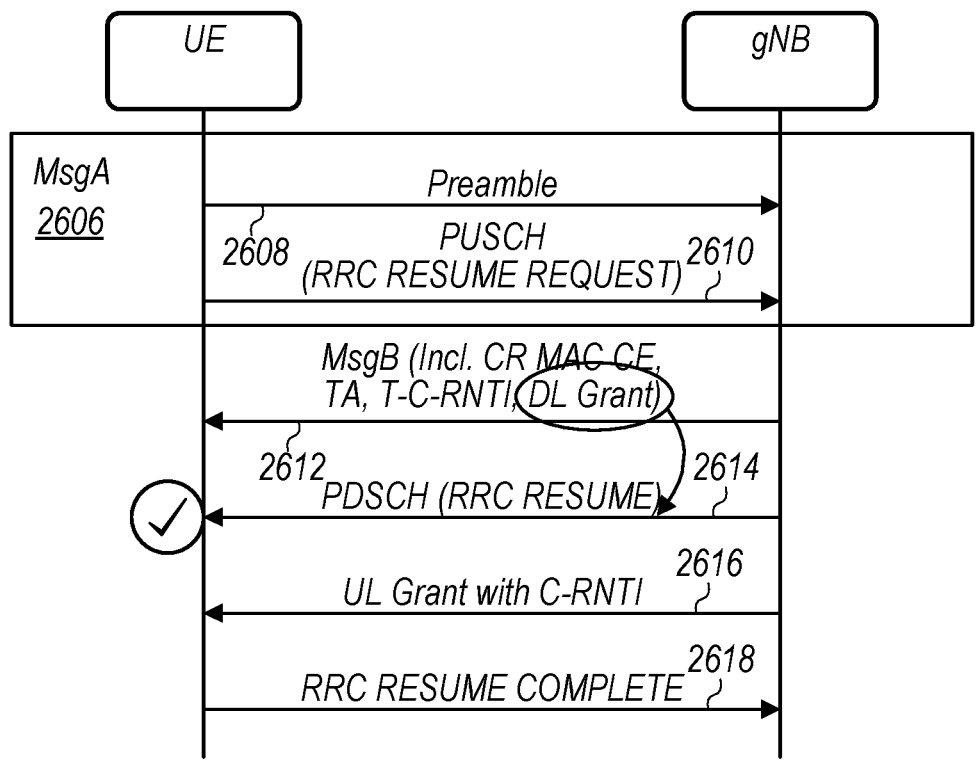

FIG. 26 is a communication flow diagram, illustrating a 2-step RA procedure for an RRC resume procedure, according to some embodiments. The UE may transmit MsgA to the gNB (2606). MsgA may include a preamble (2608) and an RRC resume request on PUSCH resources (2610). In response to MsgA, the BS may respond with MsgB (e.g., including a CR MAC CE, DL grant, T-C-RNTI, and/or TA MAC CE) (2612). MsgB may be transmitted on a common logical channel (e.g., such as a shared physical channel). Thus, the RA procedure may be complete and successful. The BS may also transmit an RRC resume message (e.g., on PDSCH) (2614). The PDSCH resources used for the RRC resume message may be allocated by the DL grant included in MsgB. The BS may further transmit a UL grant (e.g., including an indication of the C-RNTI of the UE, e.g., to replace the T-C-RNTI) (2616), and the UE may use the resources indicated by the UL grant to transmit an RRC resume complete message to the BS (2618).

Figure 27:
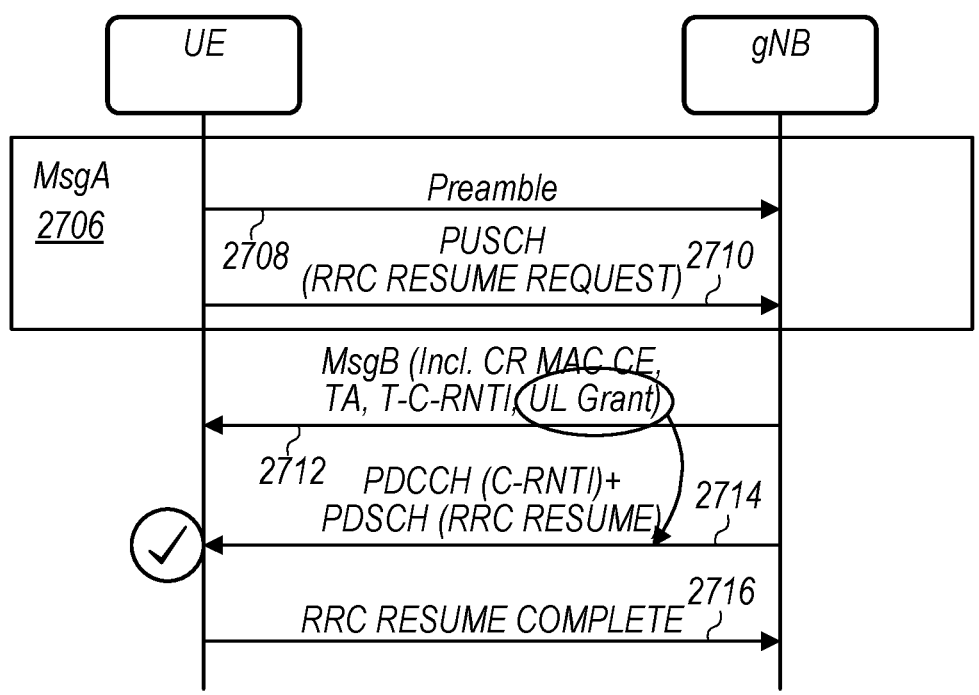

FIG. 27 is a communication flow diagram, illustrating a 2-step RA procedure for an RRC resume procedure, according to some embodiments. The UE may transmit MsgA to the gNB (2706). MsgA may include a preamble (2708) and an RRC resume request on PUSCH resources (2710). In response to MsgA, the BS may respond with MsgB (e.g., including a CR MAC CE, UL grant, T-C-RNTI, and/or TA MAC CE) (2712). MsgB may be transmitted on a common logical channel (e.g., such as a shared physical channel). Thus, the RA procedure may be complete and successful. The BS may also transmit an indication of the C-RNTI (e.g., on PDCCH) and an RRC resume message (e.g., on PDSCH) (2714). The UE may use the resources indicated by the UL grant in MsgB to transmit an RRC resume complete message to the BS (2716).

FIGS. 28-31 illustrate MsgA design according to option 2, discussed above, e.g., MsgA may include a portion of the content as Msg3 of a 4-step RA procedure, according to some embodiments.

FIG. 28 is similar to FIGS. 11 and 21, and illustrates the contents of MsgA and MsgB for idle and inactive RRC states, e.g., in context of option 2 for MsgA, according to some embodiments. As shown, for an idle or inactive UE, MsgA may include a MAC PDU with LCID (e.g., of a value that may be configured as desired, illustrated as "xxxx") and a CCCH MAC CE (e.g., in contrast to the CCCH MAC SDU of FIG. 21). The CCCH MAC CE is further illustrated and described with respect to FIGS. 30 and 31. In response, MsgB may include a CR MAC CE including some or all of the CCCH MAC CE.

FIG. 29 is a communication flow diagram, illustrating a 2-step RA procedure for an idle or inactive UE, according to some embodiments. The UE may transmit MsgA to the gNB (2906). MsgA may include a preamble (2908) and a CCCH MAC CE on PUSCH resources (2910). In response to MsgA, the BS may respond with MsgB (e.g., including a CR MAC CE based on the CCCH MAC CE) (2912). MsgB may be transmitted on a common logical channel (e.g., such as a shared physical channel). Thus, the RA procedure may be complete and successful. The UE and BS may exchange UL and/or DL data and/or control information (e.g., according to any grant(s) in MsgB) (2914). The UL/DL exchanges may occur on DCCH and/or DTCH logical channels.

FIGS. 30 and 31 illustrate two exemplary designs of a CCCH MAC CE, according to some embodiments. As shown in FIG. 30, the CCCH MAC CE may include a partial UE identifier (such as I-RNTI or S-TMSI, among various possibilities), a message type (Msg Type) field, and an establishment cause field. The Msg type and establishment cause fields may carry the same meaning (e.g., as in existing RRC messages), or may be configured with different or additional meanings as desired. As shown in FIG. 31, the CCCH MAC CE may include a random value (e.g., in order to make the contents more random for purposes of contention resolution, e.g., in the case of a collision between multiple RA attempts), a message type (Msg Type) field, and an establishment cause field. The Msg type and establishment cause fields may carry the same meaning (e.g., as in existing RRC messages), or may be configured with different or additional meanings as desired.

FIGS. 32-36—MsgB Design

FIGS. 32-36 illustrate MsgB design, according to some embodiments.

Figure 32:
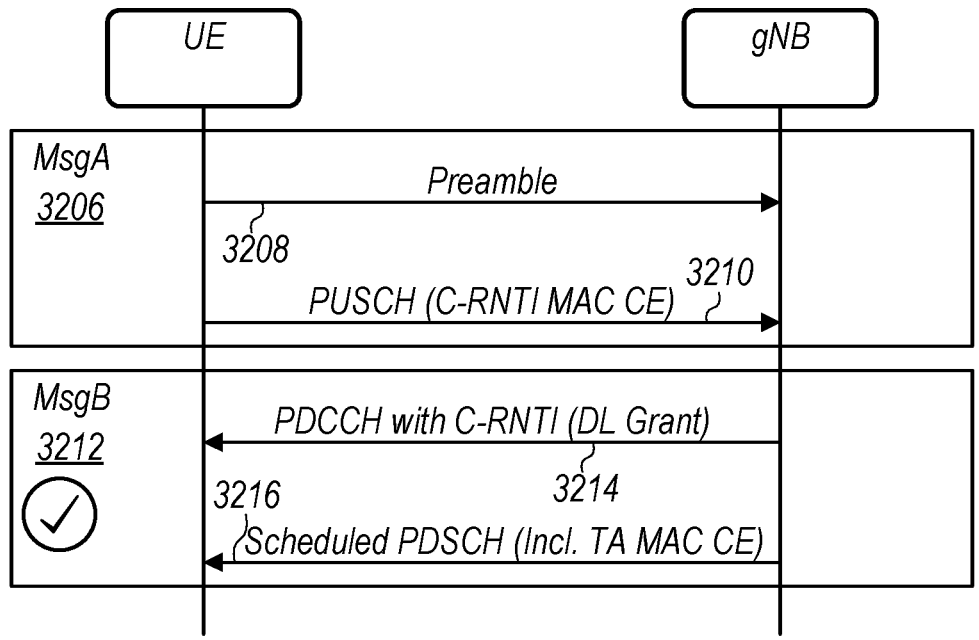

FIG. 32 is a communication flow diagram, illustrating a 2-step RA procedure for connected UE with MsgB designed according to option 1 (e.g., scheduled by PDCCH with C-RNTI), according to some embodiments. The UE may transmit MsgA to the gNB (3206). MsgA may include a preamble (3208) and a C-RNTI MAC CE (e.g., on PUSCH resources) (3210). In response to MsgA, the BS may respond with MsgB (3212). MsgB may include a PDCCH transmission with C-RNTI (3214). The PDCCH transmission may include a DL grant. MsgB may also include a scheduled PDSCH transmission (e.g., according to the DL grant) including a TA MAC CE (3216). Thus, the RA procedure may be complete and successful, e.g., if the UE receives the PDCCH with C-RNTI and the scheduled DL MAC PDU includes TA MAC CE.

Figure 33:
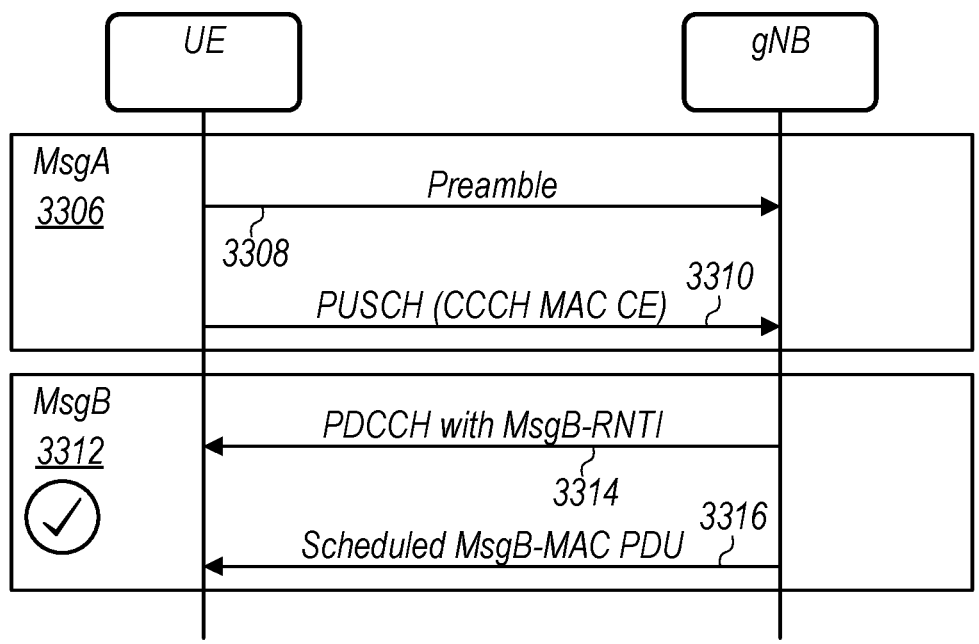

FIG. 33 is a communication flow diagram, illustrating a 2-step RA procedure for connected UE with MsgB designed according to option 2 (e.g., scheduled by PDCCH with MsgB-RNTI associated with the transmitted MsgA resource), according to some embodiments. The UE may transmit MsgA to the gNB (3306). MsgA may include a preamble (3308) and a CCCH MAC CE (e.g., on PUSCH resources) (3310). In response to MsgA, the BS may respond with MsgB (3312). MsgB may include a PDCCH transmission with MsgB-RNTI (3314). MsgB-RNTI may be determined in at least two alternative ways.

Figure 34:
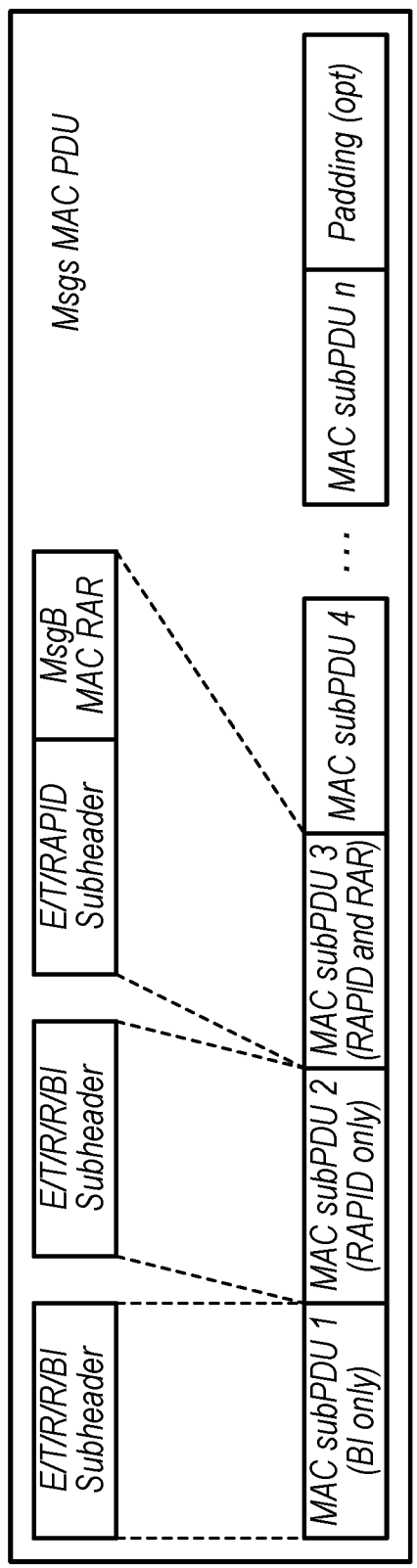

In a first alternative, MsgB-RNTI may be associated with PRACH resource, e.g., in a similar way as RA-RNTI may be computed in 4-step RACH (e.g., MsgB-RNTI may be thought of as MsgB-RA-RNTI). Thus, a MsgB-MAC PDU may include multiple MsgB-RARs for different preambles mapped on the same PRACH resource as illustrated in FIG. 34. Co-existence of RA-RNTI and MsgB-RA-RNTI may be permitted. For example, if different PRACH resources are configured for 2-step and 4-step RA, MsgB-RA-RNTI may reuse RA-RNTI computation approaches. In other words, the same computation approach applied to the different PRACH resources for 2-step and 4-step RA will avoid conflicts between the resources used for MsgB-RA-RNTI (e.g., for 2-step RA) and RA-RNTI (e.g., for 4-step RA).

In a second alternative, MsgB-RNTI may be associated with the preamble transmitted in MsgA (e.g., MsgB-RNTI may be thought of as MsgB-Preamble-RNTI or MsgB-P-RNTI). Thus, a MsgB-MAC PDU may include one MsgB-RAR for a specific preamble as illustrated in FIG. 35.

Returning to FIG. 33, the MsgB PDCCH transmission may also schedule a DL transmission of a MsgB-MAC PDU and the BS may transmit the scheduled MsgB-MAC PDU to the UE (3316). Thus, the RA procedure may be complete and successful, e.g., if the UE receives the PDCCH with C-RNTI and the scheduled DL MAC PDU includes TA MAC CE.

FIG. 36 illustrates an exemplary MsgB MAC RAR in context of option 2 for MsgB (e.g., using MsgB-RNTI, e.g. derived from the MsgA transmission resource), according to some embodiments. As illustrated, the exemplary MsgB MAC RAR includes several octets. The included octets may be similar to those illustrated in FIGS. 10 and 12 and described above. For example, the first 7 octets may include R, a timing advance (TA) command, one or more UL and/or DL grant(s), and a T-C-RNTI. The T-C-RNTI may be used for further UE-specific transmissions and scheduling. The remaining octets may include a UE CR identity, e.g., indicating to the UE the result of the RA procedure.

In some embodiments, the MsgA of FIG. 32 may include a CCCH MAC CE (e.g., on PUSCH resources) (e.g., in 3210, in place of the illustrated C-RNTI MAC CE). For example, a connected UE may report a random value in the CCCH MAC CE (e.g., as illustrated in FIG. 31). The procedure may thus be similar to the Option 2 for idle/inactive UEs. Thus, MsgB may include the MsgB-RNTI and scheduled MAC PDU as shown in FIG. 33.

Figure 37:
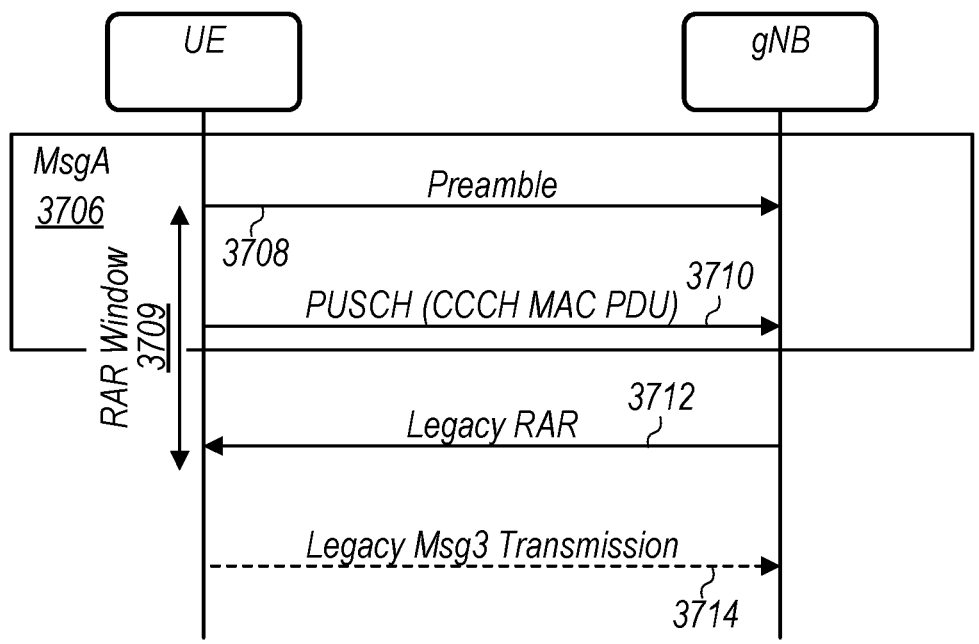
FIGS. 37-38 illustrate fallback to 4-step random access, according to some embodiments.
Figure 38:
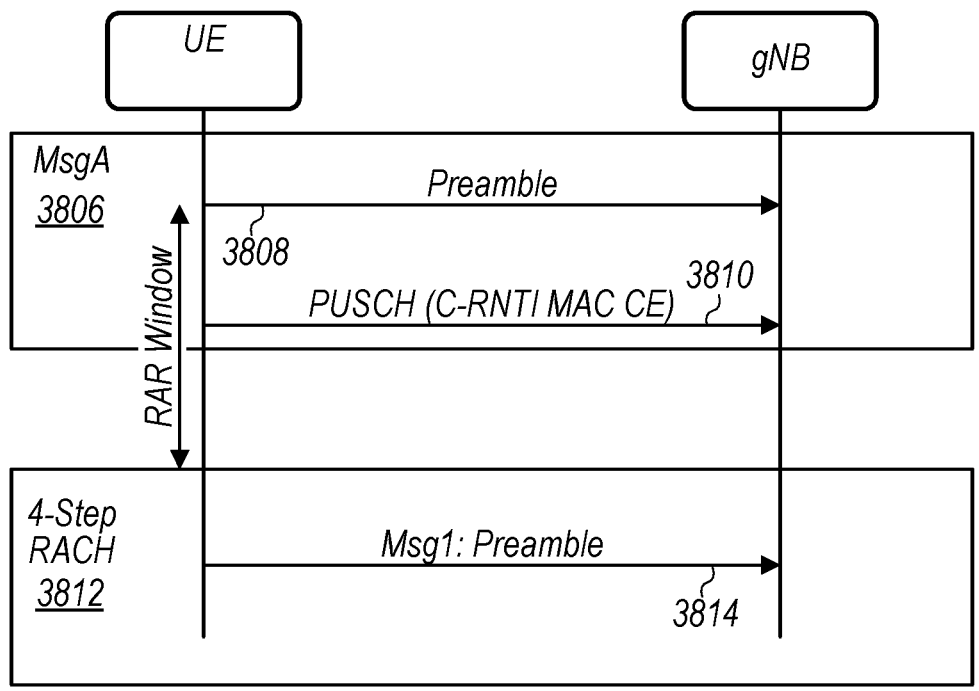

FIGS. 37-38—Fallback to 4-Step RA

After transmitting MsgA, a UE may start monitoring for MsgB (e.g., within 2-step RA) and may also start monitoring legacy Msg2 (e.g., for 4-step RA) simultaneously. The UE may monitor for MsgB and/or Msg2 within respective (e.g., 2-step and 4-step or legacy) RAR windows. The RAR windows may be configured according to received RA configuration information, wireless standards, or as desired. The 2-step and 4-step RAR windows may be the same, or may be different and may or may not overlap in time and/or frequency.

If the UE receives a MsgB (e.g., directed to the UE) during the 2-step RAR window, the UE may proceed with 2-step RA. Otherwise, the UE may fallback to 4-step RA, according to some embodiments.

FIG. 37 illustrates a first exemplary fallback procedure, according to some embodiments. In the first exemplary fallback procedure, if the UE receives a legacy Msg2/RAR (e.g., addressed to it), the UE may fallback to 4-step RA, e.g., it may apply UL TA and transmit Msg3 according to the UL grant indicated in RAR. The UE may transmit MsgA (3706) to the BS. The MsgA may include a preamble (3708) and a CCCH MAC PDU on PUSCH (3710). It will be appreciated that the illustrated CCCH MAC PDU is exemplary only and that other transmissions are possible (e.g., a C-RNTI MAC CE) in 3710. An RAR window may begin based on the time of the transmission of the preamble (or, alternatively, of the CCCH MAC PDU) (3709). The UE may initiate a timer at the beginning of the RAR window. The BS may transmit and the UE may receive a legacy RAR (e.g., Msg2) during the RAR window (3712). Based on receiving the legacy RAR, the UE may determine that a fallback criterion is satisfied and may fallback to 4-step RA. For example, the UE may transmit a legacy Msg3 (3714). After the Msg3, the UE and BS may complete the 4-step RA procedure (e.g., including Msg4) and may proceed to exchange DTCH and/or DCCH messages including control signaling and/or data.

FIG. 38 illustrates a second exemplary fallback procedure, according to some embodiments. In the second exemplary fallback procedure, if, during the RAR window(s) the UE receives neither a legacy Msg2/RAR nor MsgB (e.g., addressed to it), the UE may fallback to 4-step RA, e.g., beginning with the preamble retransmission. Similarly, if the UE receives a message from the BS directing the UE to fallback to 4-step RA, it may do so. The UE may transmit MsgA (3806) to the BS. The MsgA may include a preamble (3808) and a C-RNTI MAC CE on PUSCH (3810). It will be appreciated that the illustrated C-RNTI MAC CE is exemplary only and that other transmissions are possible (e.g., a CCCH MAC PDU) in 3810. An RAR window may begin based on the time of the transmission of the preamble (or, alternatively, of the C-RNTI MAC CE) (3809). The UE may initiate a timer at the beginning of the RAR window. The UE may not receive any RAR (e.g., MsgB or Msg2) directed to it during the RAR window. Based on expiration of the RAR window (e.g., expiration of the timer for the RAR window) prior to (e.g., without) receiving any responsive RAR, the UE may determine that a fallback criterion is met and may fallback to 4-step RA (3812). For example, the UE may transmit a legacy Msg1, e.g., preamble (3814). After the Msg1, the UE and BS may complete the 4-step RA procedure (e.g., including Msg2-Msg4) and may proceed to exchange DTCH and/or DCCH messages including control signaling and/or data.

RA Retransmission and Additional Information

RA type (e.g., 2-step or 4-step) may be selected for RACH retransmission according to various exemplary options. In a first exemplary option, following a 2-step RA failure, a 4-step RA procedure may be used for the retransmission case. In other words, after receiving a negative response (or no response) to MsgA, a UE may retry using a 4-step RA procedure (e.g., beginning with Msg1). Alternatively, the UE may be configured to perform a number (e.g., one or more) retransmission attempt (e.g., of MsgA for 2-step RA) before selecting 4-step RA for further retransmission attempts.

In a second exemplary option, for each preamble retransmission, the RA type may be selected based on current radio conditions (e.g. a signal strength or quality threshold). According to some embodiments, the threshold may vary with the number of previous transmission attempts.

Similarly, a backoff mechanism may be applied in various exemplary ways for RA retransmissions. For example, if a backoff indicator (BI) is provided in MsgB or Msg2 and a different RA type is selected for the next RA retransmission, the backoff mechanism may not applied, according to some embodiments. Alternatively, the backoff mechanism may be applied in 2-step to 4-step or/and 4-step to 2-step case. Parameters of the backoff mechanism may vary according to the different cases, e.g., different backoff periods may be used. Parameters and/or criteria for application of the backoff mechanism may be included in RA configuration information, e.g., received from the base station.

Similarly, a power ramping mechanism may be applied in various exemplary ways for RA retransmissions. For example, if a different RA type is selected for the next RA retransmission (e.g., relative to a previous RA attempt), the power ramping mechanism may not applied, according to some embodiments. Alternatively, the power ramping mechanism may be applied in 2-step to 4-step or/and 4-step to 2-step case. Parameters of the power ramping mechanism may vary according to the different cases, e.g., different power ramping rates may be used. Parameters and/or criteria for application of the power ramping mechanism may be included in RA configuration information, e.g., received from the base station.

In the following, exemplary embodiments are provided.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Yet another exemplary set of embodiments may include a 5G NR network node or base station configured to perform any action or combination of actions as substantially described herein in the Detailed Description and/or Figures.

Yet another exemplary set of embodiments may include a 5G NR network node or base station that includes any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
 a processor configured to cause a user equipment device (UE) to:
  receive, from a base station, random access (RA) configuration information, including, first configuration information for a 2-step RA procedure, second configuration information for a 4-step RA procedure, and a criterion for power ramping, the criterion for power ramping specifying that power ramping should not be applied to an RA retransmission if a different RA type is selected relative to a previous RA attempt;

determine a condition, wherein the condition is that a measured reference signal received power (RSRP) is greater than a threshold;

determine, based on the condition that the measured RSRP is greater than the threshold, to perform the 2-step RA procedure;

perform one or more transmissions, to the base station, of respective first messages of the 2-step RA procedure, wherein a first message of the 2-step RA procedure includes a preamble and content on a physical uplink shared channel;

within a 2-step random access response window and as part of the 2-step RA procedure:

monitor a physical downlink control channel (PDCCH) masked by a msgB radio network temporary identifier (msgB-RNTI);

based on the monitoring, receive a msgB indicating a backoff indicator for a backoff mechanism to be applied on a next preamble transmission; and when the 4-step RA procedure is selected for a next preamble transmission in response to reaching a configured number of transmission attempts of first messages of the 2-step RA procedure before falling back to the 4-step RA procedure, the backoff mechanism is not applied.

2. The apparatus of claim 1, wherein the processor is further configured to cause the UE to:

start a timer associated with the 2-step random access response window when the first message of the 2-step RA procedure is transmitted.

3. The apparatus of claim 1, wherein, to fallback to the 4-step RA procedure, the processor is further configured to cause the UE to:

transmit, to the base station, a first message of the 4-step RA procedure.

4. The apparatus of claim 1, wherein at least one fallback criterion specifies a message for indicating a fallback, wherein, to determine that the at least one fallback criterion is satisfied, the processor is further configured to cause the UE to:

receive, from the base station, the message for indicating a fallback.

5. The apparatus of claim 4, wherein the message for indicating a fallback includes a second message of the 4-step RA procedure.

6. The apparatus of claim 1, wherein the RA configuration information further specifies a criterion for backoff.

7. A user equipment device (UE), comprising:
a radio; and
a processor operably connected to the radio and configured to cause the UE to:

receive, from a base station, random access (RA) configuration information, including, first configuration information for a 2-step RA procedure, second configuration information for a 4-step RA procedure, and a criterion for power ramping, the criterion for power ramping specifying that power ramping should not be applied to an RA retransmission if a different RA type is selected relative to a previous RA attempt;

determine a condition, wherein the condition is that a measured reference signal received power (RSRP) is greater than a threshold;

determine, based on the condition that the measured RSRP is greater than the threshold, to perform the 2-step RA procedure;

perform one or more transmissions, to the base station, of respective first messages of the 2-step RA procedure, wherein a first message of the 2-step RA procedure includes a preamble and content on a physical uplink shared channel;

within a 2-step random access response window and as part of the 2-step RA procedure:

monitor a physical downlink control channel (PDCCH) masked by a msgB radio network temporary identifier (msgB-RNTI);

based on the monitoring, receive a msgB indicating a backoff indicator for a backoff mechanism to be applied on a next preamble transmission; and when the 4-step RA procedure is selected for a next preamble transmission in response to reaching a configured number of transmission attempts of first messages of the 2-step RA procedure before falling back to the 4-step RA procedure, the backoff mechanism is not applied.

8. The UE of claim 7, wherein the processor is further configured to cause the UE to:

start a timer associated with the 2-step random access response window when the first message of the 2-step RA procedure is transmitted.

9. The UE of claim 7, wherein, to fallback to the 4-step RA procedure, the processor is further configured to cause the UE to:

transmit, to the base station, a first message of the 4-step RA procedure.

10. The UE of claim 7, wherein at least one fallback criterion specifies a message for indicating a fallback, wherein, to determine that the at least one fallback criterion is satisfied, the processor is further configured to cause the UE to:

receive, from the base station, the message for indicating a fallback.

11. The UE of claim 10, wherein the message for indicating a fallback includes a second message of the 4-step RA procedure.

12. The UE of claim 7, wherein the RA configuration information further specifies a criterion for backoff.

13. A method, comprising:
at a user equipment device (UE):

receiving, from a base station, random access (RA) configuration information, including, first configuration information for a 2-step RA procedure, second configuration information for a 4-step RA procedure, and a criterion for power ramping, the criterion for power ramping specifying that power ramping should not be applied to an RA retransmission if a different RA type is selected relative to a previous RA attempt;

determining a condition, wherein the condition is that a measured reference signal received power (RSRP) is greater than a threshold;

determining, based on the condition that the measured RSRP is greater than the threshold, to perform the 2-step RA procedure;

performing one or more transmissions, to the base station, of respective first messages of the 2-step RA procedure, wherein a first message of the 2-step RA procedure includes a preamble and content on a physical uplink shared channel;

within a 2-step random access response window and as part of the 2-step RA procedure:
monitoring a physical downlink control channel (PDCCH) masked by a msgB radio network temporary identifier (msgB-RNTI);
based on the monitoring, receiving a msgB indicating a backoff indicator for a backoff mechanism to be applied on a next preamble transmission; and when the 4-step RA procedure is selected for a next preamble transmission in response to reaching a configured number of transmission attempts of first messages of the 2-step RA procedure before falling back to the 4-step RA procedure, the backoff mechanism is not applied.

14. The method of claim 13,
wherein the method further comprises:
starting a timer associated with the 2-step random access response window when the first message of the 2-step RA procedure is transmitted.

15. The method of claim 13, wherein, to fallback to the 4-step RA procedure, comprises:
transmitting, to the base station, a first message of the 4-step RA procedure.

16. The method of claim 13,
wherein at least one fallback criterion specifies a message for indicating a fallback,
wherein, to determine that the at least one fallback criterion is satisfied, the method comprises:
receiving, from the base station, the message for indicating a fallback.

17. The method of claim 16, wherein the message for indicating a fallback includes a second message of the 4-step RA procedure.

18. The method of claim 16, wherein, to fallback to the 4-step RA procedure, the method comprises:
transmitting, to the base station, a third message of the 4-step RA procedure.

19. The method of claim 13, wherein the RA configuration information further specifies a criterion for backoff.

20. The method of claim 19, wherein the criterion for backoff specifies that backoff should not be applied to an RA retransmission if a different RA type is selected relative to a previous RA attempt.

* * * * *